US011307291B1

(12) United States Patent
Aljohani et al.

(10) Patent No.: US 11,307,291 B1
(45) Date of Patent: Apr. 19, 2022

(54) METHOD AND APPARATUS FOR ESTIMATING A PATH OF AN AERIAL VEHICLE

(71) Applicant: King Abdulaziz University, Jeddah (SA)

(72) Inventors: Abdulah Aljohani, Jeddah (SA); Ubaid M. Al-Saggaf, Jeddah (SA); Muhammad Moinuddin, Jeddah (SA); Waleed Aldosari, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/352,906

(22) Filed: Jun. 21, 2021

(51) Int. Cl.
| | | |
|---|---|---|
| *G01S 7/38* | (2006.01) | |
| *B64C 39/02* | (2006.01) | |
| *G01S 13/04* | (2006.01) | |

(52) U.S. Cl.
CPC .............. *G01S 7/38* (2013.01); *B64C 39/024* (2013.01); *G01S 13/04* (2013.01); *B64C 2201/121* (2013.01)

(58) Field of Classification Search
CPC .......... B64C 2201/141; B64C 2201/12; B64C 2201/027; B64C 2201/121; B64C 39/024;
(Continued)

(56) References Cited

U.S. PATENT DOCUMENTS

| | | | |
|---|---|---|---|
| 6,240,367 B1 * | 5/2001 | Lin ........................ | G01C 21/28 |
| | | | 701/472 |
| 2007/0118286 A1 * | 5/2007 | Wang .................... | G01C 21/165 |
| | | | 342/357.65 |

(Continued)

FOREIGN PATENT DOCUMENTS

| | | | | |
|---|---|---|---|---|
| CN | 109633695 A | | 4/2019 | |
| EP | 2846174 A1 * | | 3/2015 | ............... H04K 3/90 |

(Continued)

OTHER PUBLICATIONS

Waleed Aldosari, et al., "Distributed Extended Kalman Filtering Based Techniques for 3-D UAV Jamming Localization", Sensors, vol. 20, Issue 6405, Nov. 10, 2020, pp. 1-18.

*Primary Examiner* — Olumide Ajibade Akonai
(74) *Attorney, Agent, or Firm* — Oblon, McClelland, Maier & Neustadt, L.L.P.

(57) ABSTRACT

Methods and apparatuses are provided for estimating a path of an aerial vehicle engaged in attacking network devices in a wireless communication network. A distance function corresponding to the aerial vehicle and a boundary node is determined based on an initial coordinate location of the aerial vehicle and an initial coordinate location of the boundary node. A function of jamming power received at the boundary node from the aerial vehicle is determined based at least on the first distance function and a transmission power of the boundary node. The function of jamming power represents a power associated with a jamming signal received from the aerial vehicle at the boundary node. A trajectory of the aerial vehicle at a plurality of time periods is estimated by the boundary node with an extended Kalman filter. The extended Kalman filter is determined based on the function of jamming power.

20 Claims, 14 Drawing Sheets

(58) Field of Classification Search
CPC ......... B64C 2201/128; B64C 2201/145; G01S 5/0294; G01S 7/38; G01S 13/04; G01S 5/0284; G01S 5/14; G01S 5/02; G01S 19/47; G01S 13/726; G01S 19/49; H04K 3/22; H04K 3/90; H04K 3/00; H04K 2203/22; G01V 3/16; G08G 5/0069; G08G 5/0039; G08G 5/006; G01C 21/165; G01C 21/20
See application file for complete search history.

(56) References Cited

U.S. PATENT DOCUMENTS

| | | | | |
|---|---|---|---|---|
| 2009/0310664 | A1* | 12/2009 | Yannone | G01S 11/04 375/228 |
| 2011/0238307 | A1* | 9/2011 | Psiaki | G01S 19/45 701/469 |
| 2017/0291704 | A1* | 10/2017 | Alegria | G05D 1/0866 |
| 2018/0173247 | A1* | 6/2018 | Ratti | G05D 1/0094 |
| 2019/0317220 | A1* | 10/2019 | Kocer | G01S 19/10 |
| 2020/0272827 | A1 | 8/2020 | Morrow et al. | |

FOREIGN PATENT DOCUMENTS

| | | | | |
|---|---|---|---|---|
| EP | 2 963 519 B1 | | 9/2016 | |
| EP | 3267152 A1 | * | 1/2018 | ............ B64C 19/00 |
| GB | 2521246 A | * | 6/2015 | ............ G01S 19/21 |
| KR | 10-1498646 B1 | | 3/2015 | |
| KR | 10-1999942 B1 | | 7/2019 | |
| WO | WO-2015033138 A1 | * | 3/2015 | ............ G01S 19/03 |
| WO | WO 2016/142837 A1 | | 9/2016 | |

* cited by examiner

METHOD AND APPARATUS FOR ESTIMATING A PATH OF AN AERIAL VEHICLE

STATEMENT OF ACKNOWLEDGEMENT

The inventors extend their appreciation to the Deputyship for Research and Innovation, Ministry of Education in Saudi Arabia for funding this research work through the project number 2020-056 and King Abdulaziz University, DSR, Jeddah, Saudi Arabia.

BACKGROUND

Technical Field

The present disclosure is directed to systems and methods for estimating a path of an aerial vehicle and more particularly the path of an aerial vehicle engaged in attacking network devices over a wideband channel in wireless communication network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Unmanned aerial vehicles (UAVs) are a rapidly developing technology, resulting in wide-scale flight without human pilots. The use of UAVs was initially motivated by military applications, including reconnaissance, surveillance, and tracking, because UAVs could be readily equipped with sensors, cameras, radar, as well as other weaponized technologies.

Subsequently, the use of UAVs proliferated to include a wide range of applications, such as public safety, policing, transportation, package delivery, and environmental monitoring. Further, UAVs offer crucial help in rescue and recovery for disaster relief operations, when public communication networks get crippled, because they can form scalable and dynamic networks. The ability of UAVs to hover over a specified area has numerous practical and useful applications. For example, UAVs may help in localization when the global positioning system (GPS) is unavailable or less accurate.

Current wireless networks, whether delivered by terrestrial towers/stations or through airborne means, are vulnerable to jamming attacks. These jamming attacks form a subset of denial of service (DoS) attacks, and use malicious code to disrupt wireless communication. A jammer may be a UAV (also referred to as a jammer UAV) hovering around a target area to block the communication channel between two transceivers. An attack can be initiated by increasing the noise at a receiver, which is accomplished by directing the transmission of an interference signal towards the target channel. Further, detection of the jammer UAV that can potentially jam a location, is a first step towards preventing such an attack. By locating the jammer, appropriate action can be taken against the jammer UAV. For example, actions can be taken to physically destroy the jammer UAV or use another jamming source to jam the jammer UAV itself.

However, tracking and localization of UAV jammers in wireless communication networks is still a challenging undertaking.

Accordingly, it is an object of the present disclosure to develop more accurate methods and systems for estimating a path of an aerial vehicle engaged in attacking network devices over a wideband channel in wireless communication network.

SUMMARY

In an exemplary embodiment, a method for estimating a path of an aerial vehicle engaged in attacking network devices over a wideband channel in a wireless communication network is performed. A distance function corresponding to the aerial vehicle and a boundary node is determined based on an initial coordinate location of the aerial vehicle and an initial coordinate location of the boundary node. A function of jamming power received at the boundary node from the aerial vehicle is determined based at least on the first distance function and a transmission power of the boundary node. The function of jamming power represents a power associated with a jamming signal received from the aerial vehicle at the boundary node. A trajectory of the aerial vehicle at a plurality of time periods is estimated by the boundary node based on an extended Kalman filter. The extended Kalman filter is determined based on the function of jamming power.

In another exemplary embodiment, the method includes estimating the trajectory of the aerial vehicle at the plurality of time periods by the boundary node locally, without collaborating with any other node in the network. In other exemplary embodiments, the method further includes determining a power received at an unaffected node from the boundary node and determining a distance ratio coefficient based at least on the power received at the unaffected node from the boundary node, the function of jamming power and a threshold value of a signal to noise ratio at an edge node. The edge node is located at a threshold distance from the initial coordinate location of the aerial vehicle. The threshold distance is a maximum distance that the jamming signal can potentially jam any node in the network.

In exemplary embodiments, the initial coordinate location of the aerial vehicle is represented by $(x_B, y_B, z_B)$ and the initial coordinate location of the boundary node is represented by $(x_J, y_J, z_J)$ and the distance function is represented by $d_{JB}$, and $d_{JB}=\sqrt{(x_B-x_J)^2+(y_B-y_J)^2+(z_B-z_J)^2}$. In other exemplary embodiments, the function of jamming power is represented by $P_{JB}$, and $P_{JB}=P_t+k-10n\log_{10}d_{JB}+X_\sigma$, wherein $P_t$ represents the transmission power of the boundary node, k represents a constant depending on antenna characteristics of the boundary node, and $X_\sigma$ represents a Gaussian noise with zero mean.

In another exemplary embodiment, the method further includes determining another distance function corresponding to the edge node and the boundary node based at least on the distance function and the distance ratio coefficient. The method includes determining another function of jamming power received at the edge node from the aerial vehicle based at least on the function of jamming power and the distance ratio coefficient, where the other function of jamming power represents another power associated with another jamming signal received from the aerial vehicle at the edge node. The method also includes determining a function of power received at the boundary node from the edge node based at least on the function of jamming power and the distance ratio coefficient. The other function of jamming power represents a power associated with a signal received from the edge node at the boundary node. The method further includes estimating the trajectory of the aerial vehicle at the plurality of time periods by the boundary node based on another extended Kalman filter. The other extended Kalman filter is determined based on the function of jamming power, the other function of jamming power received at the edge node from the aerial vehicle, and the function of power received at the boundary node from the edge node.

In another exemplary embodiment, an apparatus is configured to estimate a path of an aerial vehicle engaged in attacking network devices over a wideband channel in a wireless communication network using the above methods.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
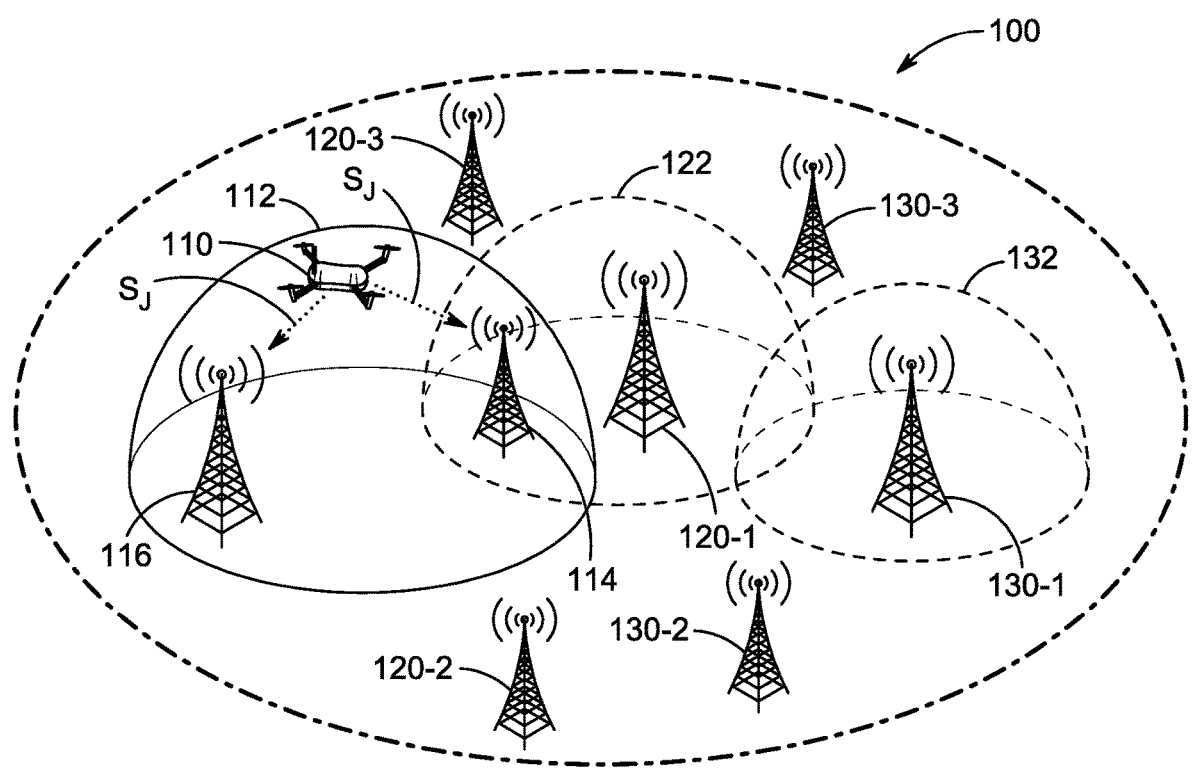
FIG. 1 is an illustration of an environment for estimating a path of an aerial vehicle, according to exemplary aspects of the present disclosure.

In the drawings, like reference numerals designate identical or corresponding parts throughout the several views.

Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or 5%, and any values there between.

Aspects of the present disclosure are directed to a method for estimating a path of an aerial vehicle. The aerial vehicle may include an unmanned aerial vehicle (i.e., a UAV) engaged in attacking network devices over a wideband channel in a wireless communication network. The UAV may include an aircraft or a drone that without a human pilot and the UAV is operated remotely. In an embodiment, the aerial vehicle may include a manned aerial vehicle.

A trajectory of the UAV is estimated by a boundary node based on an extended Kalman filter. The trajectory is estimated at a plurality of time periods. The extended Kalman filter is determined based on a function of jamming power. The estimation is based on a distance function corresponding to the UAV and a boundary node, which in turn is determined based on an initial coordinate location of the UAV and an initial coordinate location of the boundary node. The function of jamming power received at the boundary node from the UAV is determined based at least on a first distance function and a transmission power of the boundary node. The function of jamming power represents a power associated with a jamming signal received from the UAV at the boundary node.

In exemplary embodiments of the present disclosure below, a Distributed Extended Kalman Filter (DEKF) method is described for three-dimensional localization of a jamming threat. In this method, a distributed scenario is disclosed with each node using the information of the received power from the jammer at the nearby boundary node of the jamming region to perform the standard EKF. In the DEKF approach, every node processes the jamming power and estimates the jammer location locally, bypassing collaboration with other nodes. Accordingly, computational resources, system complexity, and the number of boundary nodes involved are all reduced, while eliminating the drawbacks associated with centrally calculated localization techniques.

In other embodiments of the present disclosure that follow, a distance ratio based Distributed Extended Kalman Filter (DEKF-DR) for three-dimensional localization is described. This solution is also a distributed EKF method, but the variant uses an additional edge node in addition to a single boundary node. Based on the inputs from those nodes, the concept of a Distance Ratio ($\beta$) is introduced and described in further detail below. In addition to de-centralized computation, this technique also successfully reduces the number of boundary nodes utilized to localize a jamming UAV.

Exemplary embodiments described below include an apparatus for estimating a path of an aerial vehicle engaged in attacking network devices over a wideband channel in a wireless communication network. The apparatus can be configured to estimate the path using the DEKF or DEKF-DR methods outlined above and below. Using the measured signals from one or more base stations (which can be interchangeably referred to as nodes), the apparatus can estimate the location or path of an aerial vehicle without central network processing.

FIG. 1 depicts an environment 100 for estimating a path of an aerial vehicle 110, according to exemplary aspects of the present disclosure. The environment 100 includes the aerial vehicle 110 (alternatively referred to as UAV 110 or jammer 110), which is a UAV transmitting one or more interference signals (also referred to as jamming signals) in order to disrupt nodes 116 and 114 within the environment 100 found within a jamming range. The jamming range 112 is shown as a dotted circle around the jammer 110, which is an area within which the jammer 110 can effectively jam the nodes 116 and 114 (also referred to as jammed nodes 116 and 114). The nodes 116 and 114 operate as base stations to receive and transmit signals between user devices (not shown) within the environment 100. Also included in environment 100 are jammed nodes 114 and 116, depicted within the jamming range 112 and within close proximity to the jammer 110. Further, jamming signals, denoted as "$S_J$", are also shown within the jamming range 112, being transmitted directionally from the jammer 110 to the jammed nodes 114 and 116.

As illustrated in FIG. 1, the environment 100 also includes plurality of boundary nodes 120-1, 120-2, and 120-3. The boundary nodes 120-1, 120-2, and 120-3 operate as base stations that are located outside the jamming range 112 of the jammer 110. However, a sensing range 122 of the boundary node 120-1 may overlap the jamming range 112 (to varying degrees, dependent on the topology of the given network). While a single sensing range 122 of one boundary node 120-1 is shown in FIG. 1, it will be understood that each of the boundary nodes 120-1, 120-2, and 120-3 have a corresponding sensing range and that each will overlap the jamming range 112 to some degree. The overlap between the respective sensing ranges 122 of the corresponding boundary nodes 120-1, 120-2, and 120-3 with the jamming range 112 defines each of the boundary nodes 120-1, 120-2, and 120-3 as boundary nodes.

Also shown in FIG. 1, environment 100 includes plurality of unaffected nodes 130-1, 130-2, and 130-3. Each of unaffected nodes 130-1 to 130-3 has a sensing range 132, but this aspect is again shown for only a single instance (unaffected node 130-1). However, sensing ranges should be understood to apply to all of unaffected nodes 130-1, 130-2, and 130-3. If any of the boundary nodes 120-1, 120-2, and 120-3 are adjacent to the unaffected nodes 130-1 through 130-3, then the sensing range 132 overlaps the sensing range 122 of the respective adjacent boundary nodes 120-1, 120-2, and 120-3. Depending on the number of unaffected nodes in environment 100 and network topology, some additional unaffected nodes may only be adjacent to other unaffected nodes. However, the sensing range 132 does not overlap the jamming range 112 of the jammer 110, which defines this group of these base stations as unaffected nodes.

Each of the nodes in the environment 100 (i.e., the jammed nodes 114 and 116, all of boundary nodes 120-1, 120-2, and 120-3, and all of unaffected nodes 130-1, 130-2, and 130-3) can include standard base stations and various computing devices that accompany a base station. For example, each of the nodes can include a base transceiver station with transceivers (transmitters/receivers), antennas, as well as the encryption and decryption equipment used for communicating with a base station controller. The various types of base stations and associated equipment will be known to one of skill in the relevant art and are not further elaborated upon here for the sake of brevity.

Figure 2:
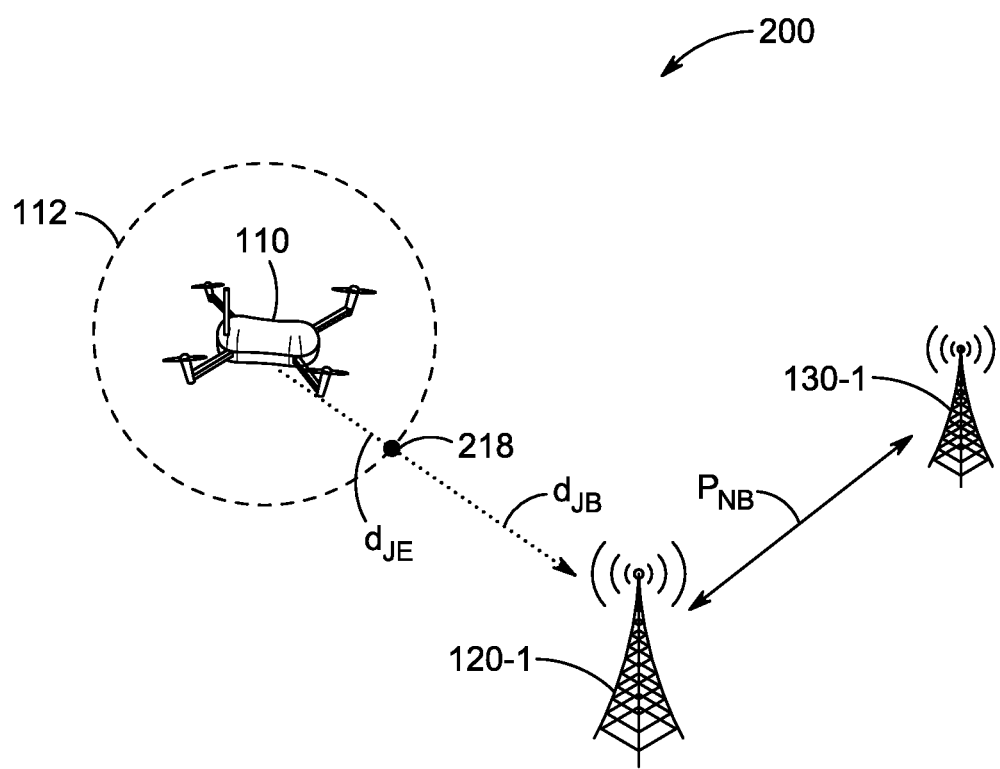
FIG. 2 is an illustration of a jamming scenario with a distance ratio between a jammer and two base stations positioned outside the jamming range, according to exemplary aspects of the present disclosure.

Turning to FIG. 2, an exemplary jamming scenario 200 is illustrated with a distance ratio between a jammer and two base stations positioned outside the jamming range. As an example, the jamming scenario 200 depicts the jammer 110, the jamming range 112, the boundary node 120-1 and unaffected node 130-1, such as the similarly numbered elements found in environment 100 in FIG. 1. Additionally, the jamming scenario 200 includes an edge node 218, which denotes a point on the edge of the jamming range 112 (i.e., a point between the jammer 110 and the boundary node 120-1 along the outer edge of the jamming range 112).

As depicted in the jamming scenario 200, two parameters denoted as "$d_{JB}$" and "$d_{JE}$" are the distances from the jammer 110 to the boundary node 120-1 and from the jammer 110 to the edge node 218, respectively. A distance function used in the estimation of a path of the jammer 110 uses both parameters according to embodiments of the present disclosure. In one example implementation, the distance function may be a distance ratio. The distance ratio is the relationship between a signal to noise ratio at the edge node 218, jamming power received by the boundary node 120-1 and received signal strength (RSS) from the boundary nodes 120-1, 120-2, and 120-2.

Based on the above descriptions, the parameters $d_{JB}$ and $d_{JE}$, can be represented as shown below in Equations 1 and 2, respectively. Both equations express the distance in terms of coordinates along the x, y, and z axes, using subscript notation corresponding to the endpoints. For example, the x coordinate for boundary node 120-1 is $x_B$, the y coordinate for edge node 218 is $y_E$, while the z coordinate for jammer 110 is $z_J$, and so forth. Because the jammer 110 can be motion, it will be understood by one of skill in the relevant art that the coordinates can change over time (and thus may include initial coordinates, final coordinates, or some intermediate location coordinates).

$$d_{JB}=\sqrt{(x_B-x_J)^2+(y_B-Y_J)^2+(Z_B-Z_J)^2} \qquad (1)$$

$$d_{JE}=\sqrt{(x_E-x_J)^2+(y_E-y_J)^2+(z_E-z_J)^2} \qquad (2)$$

When the jammer 110 is attempting to jam a target node, the SNR decreases as the jammer 110 moves towards the target node. In order to be successful in jamming the target node, the jammer 110 would continue moving towards the target node until the SNR drops below an acceptable threshold value, which is when the target node has an SNR value approximately equal to a system threshold value (SNR≈γ) located on the edge of the jamming range 112. This condition can be used to estimate the unknown distances between the jammer 110 and the edge node 218. The jamming power received by the boundary node 120-1 follows the Log-distance shadowing model, which in turn is an extension of the Friis equation. The jamming power received by the boundary node 120-1 (also referred to as a function of jamming power) is a proportional inverse to the distance as follows:

$$P_{JB}=P_t+k-10n\log_{10}d_{JB}+X_\sigma \qquad (3)$$

As shown in Equation 3, $P_{JB}$ is the jamming power received at distance $d_{JB}$, and $P_t$ is the transmission power. The path loss exponent n is related to the environment and it varies based on physical environment and assumed in free space environment, or Line of Sight (LoS). The Gaussian noise with zero mean is denoted by "$X_\sigma$". There is also a constant denoted by "k", which depends on characteristics of the particular antenna. As noted above, $d_{JB}$ is the distance from the jammer 110 to the boundary node 120-1.

Similarly, the jamming power received by the edge node 218 (represented by $P_{JE}$) can be expressed as:

$$P_{JE}=P_t+k-10n\log_{10}d_{JE}+X_\sigma \qquad (4)$$

Next, the underlying relationships between the various parameters, measurements and assumptions will be described. The distance ratio (β) is defined as the ratio of $d_{JE}$ to $d_{JB}$, or represented mathematically as the following.

$$\beta = d_{JE}/d_{JB} \tag{5}$$

Using the constituent geometry, the distances $d_{JE}$, $d_{JB}$, and $d_{EB}$ are shown to be related with the two following equations.

$$d_{JB} = d_{JE} + d_{EB} \tag{6}$$

$$(1-\beta) = d_{EB}/d_{JB} \tag{7}$$

As a result, the power terms $P_{JE}$, $P_{JB}$, and $P_{EB}$ are related using the distance ratio to obtain the two following equations.

$$P_{JE} = P_{JB} - 10n \log_{10}(\beta) \tag{8}$$

$$P_{EB} = P_{JB} - 10n \log_{10}(1-\beta) \tag{9}$$

As will be shown below, the above-noted equations are all related to the development of a distributed Extended Kalman Filter (EKF) algorithm for three-dimensional location estimation of the jammer 110.

Distributed Extended Kalman Filter (DEKF)

In one example implementation for a distributed Extended Kalman Filter (DEKF) for three-dimensional (3D) localization, each node employs the standard EKF. The DEKF technique employs a boundary node adjacent to the jamming region 112, such as the boundary node 120-1 adjacent to the jamming region 112 described above. The boundary node 120-1 uses the received power from the jammer 110. In the DEKF approach, every node (for example, each of boundary nodes 120-1 through 120-3 and unaffected nodes 130-1 through 130-3 above) processes the jamming power and estimates an aerial vehicle location locally without communicating with another node. The vehicle localization task, under a DEKF regime, results in a state vector that takes the form shown below. The components of the vector quantity are coordinates (i.e., x, y, or z), velocity components (denoted with a v), and acceleration components (denoted with an a), all with respect to each of the three axes. For example, the y coordinate of jammer 110 is $y_J$, while an acceleration component along the z axis is denoted with $a_z$.

$$X_k = [x_J, y_J, z_J, v_x, v_y, v_z, a_x, a_y, a_z] \tag{10}$$

The motion of the jammer 110 can be described using kinetic equation models using vector quantities as well as velocity, acceleration, and change over time components, expressed as the following:

$$x_{k+1} = x_k + v\Delta t + \frac{1}{2} a \Delta t^2 \tag{11}$$

Thus, the Jacobian matrix $A_k$ showing the first-order partial derivatives of the estimate (which can be represented as $$\left. \frac{\partial f}{\partial x_k} \right|_{(\hat{x}_{J,k-1}, \hat{y}_{J,k-1}, \hat{z}_{J,k-1})}$$

will be shown per me below:

$$A_k = \begin{bmatrix} 1 & 0 & 0 & dt & 0 & 0 & \frac{dt^2}{2} & 0 & 0 \\ 0 & 1 & 0 & 0 & dt & 0 & 0 & \frac{dt^2}{2} & 0 \\ 0 & 0 & 1 & 0 & 0 & dt & 0 & 0 & \frac{dt^2}{2} \\ 0 & 0 & 0 & 1 & 0 & 0 & dt & 0 & 0 \\ 0 & 0 & 0 & 0 & 1 & 0 & 0 & dt & 0 \\ 0 & 0 & 0 & 0 & 0 & 1 & 0 & 0 & dt \\ 0 & 0 & 0 & 0 & 0 & 0 & 1 & 0 & 0 \\ 0 & 0 & 0 & 0 & 0 & 0 & 0 & 1 & 0 \\ 0 & 0 & 0 & 0 & 0 & 0 & 0 & 0 & 1 \end{bmatrix}_{xJ,k-1, yJ,k-1, zJ,k-1} \tag{12}$$

The covariance matrices for two aspects of the noise, process noise $Q_k$ and measurement noise $R_k$, are shown in the following two expressions:

$$Q_k = \begin{bmatrix} \frac{dt^4}{4} & 0 & 0 & \frac{dt^3}{3} & 0 & 0 & \frac{dt^2}{2} & 0 & 0 \\ 0 & \frac{dt^4}{4} & 0 & 0 & \frac{dt^3}{3} & 0 & 0 & \frac{dt^2}{2} & 0 \\ 0 & 0 & \frac{dt^4}{4} & 0 & 0 & \frac{dt^3}{3} & 0 & 0 & \frac{dt^2}{2} \\ \frac{dt^3}{3} & 0 & 0 & \frac{dt^2}{2} & 0 & 0 & dt & 0 & 0 \\ 0 & \frac{dt^3}{3} & 0 & 0 & \frac{dt^2}{2} & 0 & 0 & dt & 0 \\ 0 & 0 & \frac{dt^3}{3} & 0 & 0 & \frac{dt^2}{2} & 0 & 0 & dt \\ \frac{dt^2}{2} & 0 & 0 & dt & 0 & 0 & 1 & 0 & 0 \\ 0 & \frac{dt^2}{2} & 0 & 0 & dt & 0 & 0 & 1 & 0 \\ 0 & 0 & \frac{dt^2}{2} & 0 & 0 & dt & 0 & 0 & 1 \end{bmatrix} \tag{13}$$

$$R_k = \text{diag}(\sigma_{vx}^2, \sigma_{vy}^2, \sigma_{vz}^2, \sigma_{ax}^2, \sigma_{ay}^2, \sigma_{az}^2, \sigma_{PJB}^2) \tag{14}$$

Every node with a base station has sensors and can individually provide the measurements of velocity components ($v_x$, $v_y$, $v_z$), acceleration components ($a_x$, $a_y$, $a_z$), and the power received from the jammer 110, denoted as $P_{JB}$. These are measurements detected by the boundary node 120-1. The measurement vector can be represented as:

$$z_k = [v_x, v_y, v_z, a_x, a_y, a_z, P_{JB}] \tag{15}$$

Thus, in this scenario, the observation function h and the Jacobian matrix $H_k$ (which can also be denoted as $\partial h/\partial x_k|(\hat{x}_{J,k-1}, \hat{y}_{J,k-1}, \hat{z}_{J,k-1})$) can be described, respectively, as:

$$h = [v_x, v_y, v_z, a_x, a_y, a_z, P_{JB}] \tag{16}$$

$$H_k = \begin{bmatrix} 0 & 0 & 0 & 1 & 0 & 0 & 0 & 0 & 0 \\ 0 & 0 & 0 & 0 & 1 & 0 & 0 & 0 & 0 \\ 0 & 0 & 0 & 0 & 0 & 1 & 0 & 0 & 0 \\ 0 & 0 & 0 & 0 & 0 & 0 & 1 & 0 & 0 \\ 0 & 0 & 0 & 0 & 0 & 0 & 0 & 1 & 0 \\ 0 & 0 & 0 & 0 & 0 & 0 & 0 & 0 & 1 \\ 0 & 0 & 0 & 0 & 0 & 0 & 1 & 0 & 0 \\ 0 & 0 & 0 & 0 & 0 & 0 & 0 & 1 & 0 \\ \frac{\partial P_{JB}}{\partial x_J} & \frac{\partial P_{JB}}{\partial y_J} & \frac{\partial P_{JB}}{\partial z_J} & 0 & 0 & 0 & 0 & 0 & 1 \end{bmatrix}_{(\hat{x}_{J,k-1},\hat{y}_{J,k-1},\hat{z}_{J,k-1})} \quad (17)$$

In order to evaluate the partial derivatives appearing in the Jacobian matrix of Equation 17, the relationship between the received power ($P_{JB}$) and the distance of the jammer 110 from boundary node 120-1 ($d_{JB}$) given in Equation 1 is utilized. The distance of the jammer 110 from the boundary node 120-1 shown in Equation 1 is the square root of the component distances squared.

Accordingly, the first derivative of the jamming power with respect to the position of aerial vehicle 110 at a time k is represented as follows:

$$\frac{\partial P_{JB}}{\partial x_J}\bigg|_{\hat{x}_{J,-1}} = C \frac{x_B \hat{x}_{J,k-1}}{(x_B + \hat{x}_{J,k-1})^2 + (y_B + \hat{y}_{J,k-1})^2 + (z_B + \hat{z}_{J,k-1})^2} \quad (18)$$

$$\frac{\partial P_{JB}}{\partial y_J}\bigg|_{\hat{y}_{J,-1}} = C \frac{y_B \hat{y}_{J,k-1}}{(x_B + \hat{x}_{J,k-1})^2 + (y_B + \hat{y}_{J,k-1})^2 + (z_B + \hat{z}_{J,k-1})^2} \quad (19)$$

$$\frac{\partial P_{JB}}{\partial z_J}\bigg|_{\hat{z}_{J,-1}} = C \frac{z_B \hat{z}_{J,k-1}}{(x_B + \hat{x}_{J,k-1})^2 + (y_B + \hat{y}_{J,k-1})^2 + (z_B + \hat{z}_{J,k-1})^2} \quad (20)$$

where C is a constant given by:

$$C = \frac{10n}{\ln 10} \quad (21)$$

Given that the jamming power and its relationship to the distance of the aerial vehicle is the basis for the instant methods, the DEKF technique for 3D localization of the present application can be implemented using Equations (13) and (17)-(21).

Distance-Ratio-Based Distributed Extended Kalman Filter (DEKF-DR)

In some embodiments, a distance-ratio-based distributed EKF (DEKR-DR) can be implemented by utilizing an additional edge node 218 (along with the single boundary node 120-1). In this method, both distances $d_{JB}$ and $d_{JE}$ are unknown, while the SNR at the edge node 218 is equal to the system threshold value ($SNR_E \approx \gamma$). Because of these variables and relationships, the distance ratio can be estimated by SNR and power relationships as follows below, where $P_{NB}$ is the power received at unaffected node 130-1 from the boundary node 120-1 (as depicted in FIG. 2 above):

$$\beta = 10^{\left(\frac{\gamma - P_{NB} + P_{JB}}{10n}\right)} \quad (22)$$

Continuing with the DEKR-DR technique, β is evaluated using the above relationship from Equation 23. Once determined, the value for β can be utilized in Equations (8) and (9) as listed above and described previously. Moreover, the distances can be expressed in terms of a β s seen in the following three equations:

$$d_{JB} = \sqrt{(x_B - \hat{x}_J)^2 + (y_B - \hat{y}_J)^2 + (z_B - \hat{z}_J)^2} \quad (23)$$

$$d_{JE} = d_{JB} \beta \sqrt{(x_B - \hat{x}_J)^2 + (y_B - \hat{y}_J)^2 + (z_B - \hat{z}_J)^2} (\beta) \quad (24)$$

$$d_{EB} = d_{JB}(1-\beta) \sqrt{(x_B - \hat{x}_J)^2 + (y_B - \hat{y}_J)^2 + (z_B - \hat{z}_J)^2} (1-\beta) \quad (25)$$

As seen above, Equations (17), (19), and (20) define the state vector $x_k$, the Jacobian matrix $A_k$, and the process noise $Q_k$, respectively. However, the measurement vector incorporates the power measurements from both boundary node 120-1 (i.e., $P_{JB}$) and from edge node 218 (i.e., $P_{JE}$ and $P_{EB}$). The resulting expressions follow to give the measurement vector as Equation 26 and the covariance matrix of measurement noise $R_k$ as Equation 27.

$$h = [v_x, v_y, v_z, a_x, a_y, a_z, P_{JB}, P_{JE}, P_{EB}] \quad (26)$$

$$R_k = \text{diag}(\sigma_{vx}^2, \sigma_{vy}^2, \sigma_{vz}^2, \sigma_{ax}^2, \sigma_{ay}^2, \sigma_{az}^2, P_{JB}, P_{JE}, P_{EB}) \quad (27)$$

Using the above assumptions and equations, the Jacobian matrix H for first-order partial derivatives (which can also be denoted as $\partial h/\partial x_k|(\hat{x}_{J,k-1}, \hat{y}_{J,k-1}, \hat{z}_{J,k-1})$) can be obtained as follows:

$$H_k = \begin{bmatrix} 0 & 0 & 0 & 1 & 0 & 0 & 0 & 0 & 0 \\ 0 & 0 & 0 & 0 & 1 & 0 & 0 & 0 & 0 \\ 0 & 0 & 0 & 0 & 0 & 1 & 0 & 0 & 0 \\ 0 & 0 & 0 & 0 & 0 & 0 & 1 & 0 & 0 \\ 0 & 0 & 0 & 0 & 0 & 0 & 0 & 1 & 0 \\ 0 & 0 & 0 & 0 & 0 & 0 & 0 & 0 & 1 \\ \frac{\partial P_{JB}}{\partial x} & \frac{\partial P_{JB}}{\partial y} & \frac{\partial P_{JB}}{\partial z} & 0 & 0 & 0 & 0 & 0 & 0 \\ \frac{\partial P_{JE}}{\partial x} & \frac{\partial P_{JE}}{\partial y} & \frac{\partial P_{JE}}{\partial z} & 0 & 0 & 0 & 0 & 0 & 0 \\ \frac{\partial P_{EB}}{\partial x} & \frac{\partial P_{EB}}{\partial y} & \frac{\partial P_{EB}}{\partial z} & 0 & 0 & 0 & 0 & 0 & 0 \end{bmatrix}_{(\hat{x}_{J,k-1},\hat{y}_{J,k-1},\hat{z}_{J,k-1})} \quad (28)$$

Therefore, the first derivative of jamming power with respect to the position of jammer 110 at time k will result in the following expressions across the various dimensional components:

$$\frac{\partial P_{JB}}{\partial x_J} = C_{JB} \frac{x_B \hat{x}_{J,k-1}}{(x_B + \hat{x}_{J,k-1})^2 + (y_B + \hat{y}_{J,k-1})^2 + (z_B + \hat{z}_{J,k-1})^2} \quad (29)$$

$$\frac{\partial P_{JE}}{\partial x_J} = \frac{\partial P_{JB}}{\partial x_J} \beta_k - 1 \quad (30)$$

$$\frac{\partial P_{EB}}{\partial x_J} = \frac{\partial P_{JB}}{\partial x_J} (1 - \beta_k - 1) \quad (31)$$

$$\frac{\partial P_{JB}}{\partial y_J} = C_{JB} \frac{y_B \hat{y}_{J,k-1}}{(x_B + \hat{x}_{J,k-1})^2 + (y_B + \hat{y}_{J,k-1})^2 + (z_B + \hat{z}_{J,k-1})^2} \quad (32)$$

$$\frac{\partial P_{JE}}{\partial y_J} = \frac{\partial P_{JB}}{\partial y_J} \beta_k - 1 \quad (33)$$

$$\frac{\partial P_{EB}}{\partial y_J} = \frac{\partial P_{JB}}{\partial y_J} (1 - \beta_k - 1) \quad (34)$$

-continued $$\frac{\partial P_{JB}}{\partial z_J} = C_{JB} \frac{z_B \hat{z}_{J,k-1}}{(x_B + \hat{x}_{J,k-1})^2 + (y_B + \hat{y}_{J,k-1})^2 + (z_B + \hat{z}_{J,k-1})^2} \quad (35)$$

$$\frac{\partial P_{JE}}{\partial z_J} = \frac{\partial P_{JB}}{\partial z_J} \beta_k - 1 \quad (36)$$

$$\frac{\partial P_{EB}}{\partial z_J} = \frac{\partial P_{JB}}{\partial z_J} (1 - \beta_k - 1) \quad (37)$$

$$C_{JB} = \frac{10n}{\ln 10} \quad (38)$$

The DEKF-DR algorithm for the 3D localization as explained in the pseudo-code of Table 1 below can be implemented using the Equations (28)-(38). After two steps of initialization and two steps of iterative input and output, the power values are detected ($P_{JB_k}$) or estimated ($P_{NB}$). Additional computation steps are completed to calculate the distance ratio and the power between various components (e.g., the jammer 110 to the edge 218 and the edge 218 to the boundary node 120-1). The determinations are made as described above with respect to derivative values until the final time when tracking ceases.

TABLE 1

Pseudo-code of Distance-Ratio-based Distributed
Extended Kalman Filter (DEKF-DR)

1. Set the system threshold value = γ.
2. Initialize time index (k), the boundary node index (i) and the neighbor node index (n).
3. Input: $x_{k-1}$, $P_{k|k-1} z_k$.
4. Output: $x_k$.
5. repeat
6.     k = k + 1
7.     Detect the $P_{JB_k}$.
8.     Estimate $P_{NB}$.
9.     Compute the $\beta_k$ using Eq. (5).
10.    Compute the $P_{JE_k}$ and the $P_{EB_k}$ using Eqs. (8) and (9).
11.    $\hat{x}_{k|k-1} \leftarrow f(\hat{x}_{k-1|k-1})$.
12.    $P_{k|k-1} \leftarrow A_k P_{k-1|k-1} A_k^T + Q_k$.
13.    $z_k \leftarrow h(x_k) + v_k$.
14.    Estimate $d_{JBk}$ using Eq. (1).
15.    $d_{JEk} \leftarrow \beta_k d_{JBk}$.
16.    $d_{EBk} \leftarrow (1 - \beta_k) d_{JBk}$.
17.    $K_k \leftarrow P_{k|k-1} H_k^T (H_k P_{k|k-1} H_k^T + R_k)^{-1}$.
18.    $\hat{x}_k \leftarrow \hat{x}_{k-1|k-1} + K_k (z_k - h(\hat{x}_{k|k-1}))$.
19.    $P_k \leftarrow P_{k|k-1} - K_k H_k P_{k|k-1}$.
20. until {Final time = $k_f$}

Figure 3:
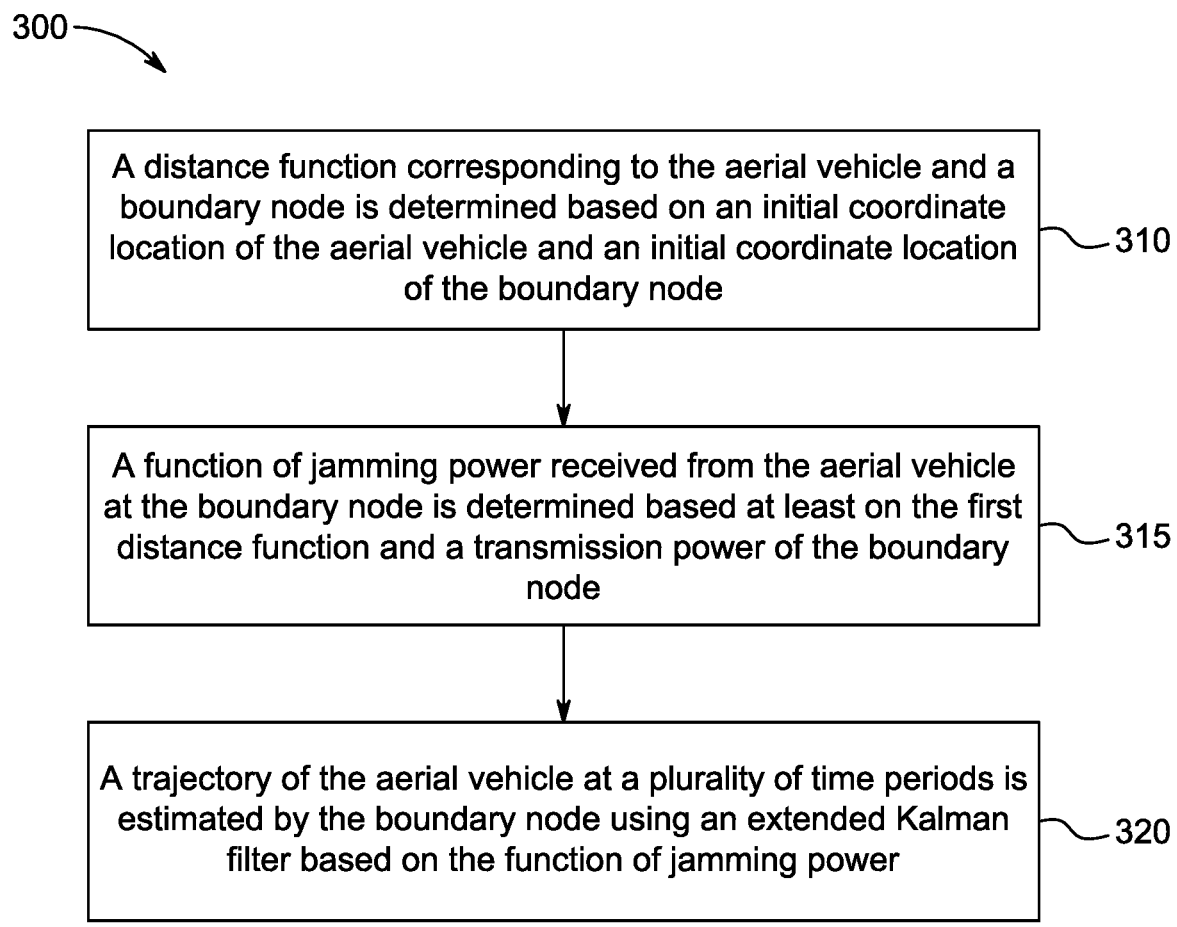
FIG. 3 is an exemplary flowchart of a method for estimating a path of the aerial vehicle, according to exemplary aspects of the present disclosure.

Turning now to FIG. 3, an exemplary flowchart of a method 300 for estimating a path of an aerial vehicle is shown, according to exemplary aspects of the present disclosure. At a step 310, a distance function corresponding to the aerial vehicle and a boundary node is determined based on an initial coordinate location of the aerial vehicle and an initial coordinate location of the boundary node. For example, the aerial vehicle and the boundary node can be the same or substantially similar to aerial vehicle 110 and boundary node 120-1 as described above with respect to FIG. 1. The initial coordinate location of the aerial vehicle can be represented by ($x_J$, $y_J$, $z_J$), the initial coordinate location of the boundary node can be represented by ($x_B$, $y_B$, $z_B$), and the distance function can be represented by $d_{JB}$. The distance function $d_{JB}$ can then be determined as the square root of the sum of differences between constituent coordinates on each axis squared, i.e., the square root of $(x_B-x_J)^2+(y_B-y_J)^2+(Z_B-Z_J)^2$.

At a step 315, a function of jamming power received at the boundary node from the aerial vehicle (i.e., aerial vehicle 110) is determined based at least on the distance function and a transmission power of the boundary node (e.g., boundary node 120-1). The function of jamming power represents a power associated with a jamming signal received from the aerial vehicle at the boundary node. The function of jamming power can be expressed as a sum of the transmission power of boundary node 120-1, an antenna constant of boundary node 120-1, and a Gaussian noise with zero mean minus the log function of the distance between aerial vehicle 110 and boundary node 120-1 as shown above in Equation 3.

At a step 320, a trajectory of the aerial vehicle at a plurality of time periods is estimated by the boundary node based on an extended Kalman filter. The extended Kalman filter is determined based on the function of jamming power. In some embodiments, method 300 includes estimating the trajectory of the aerial vehicle at the plurality of time periods by the boundary node locally (such as boundary node 120-1 of FIG. 1), without collaborating with any other node in the network (e.g., any other boundary node such as boundary node 120-2 or 120-3, or any unaffected node 130-1 through 130-3 of FIG. 1 as described above).

Figure 4:
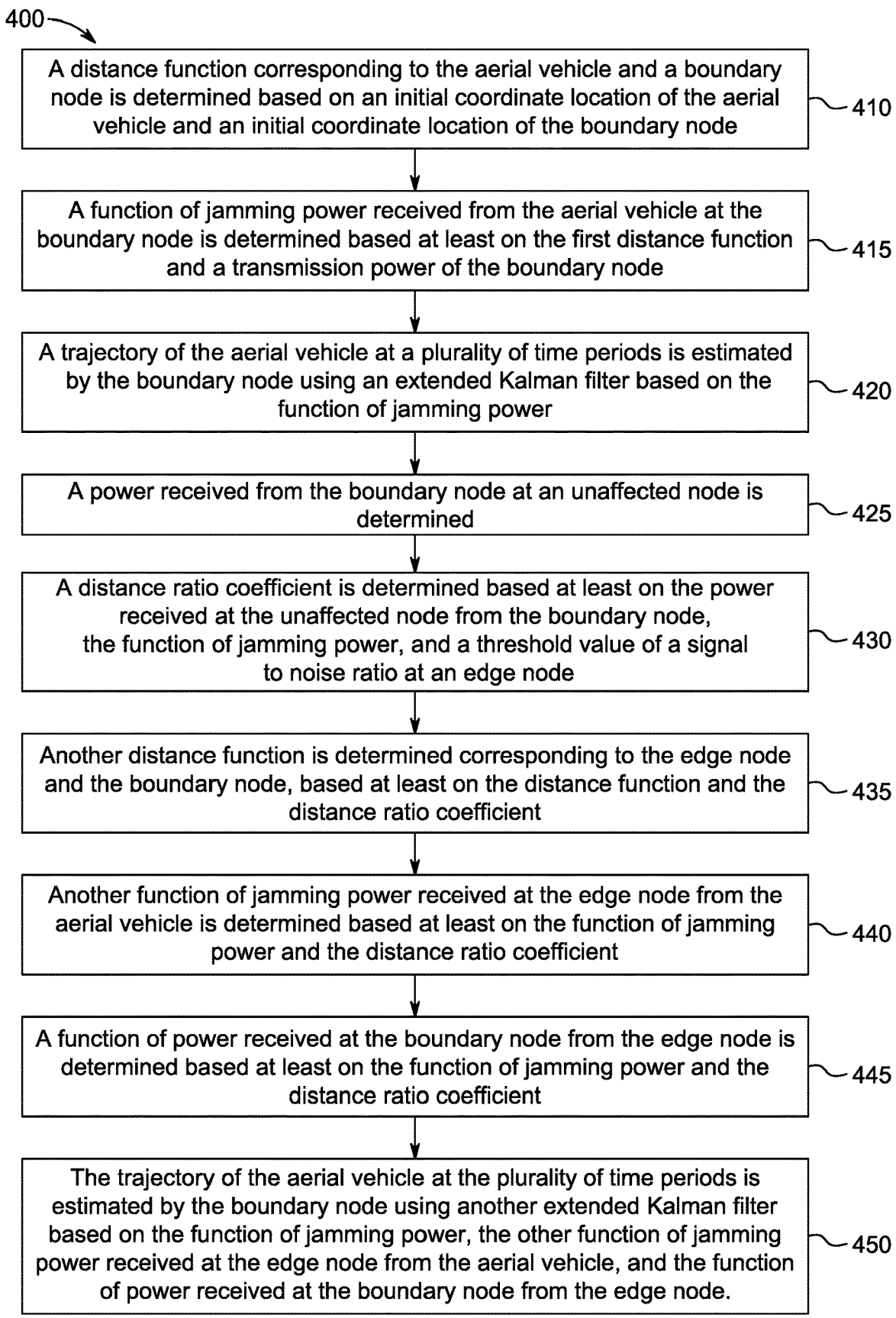
FIG. 4 is an exemplary flowchart of another method for estimating the path of the aerial vehicle, according to exemplary aspects of the present disclosure.
Figure 5A:
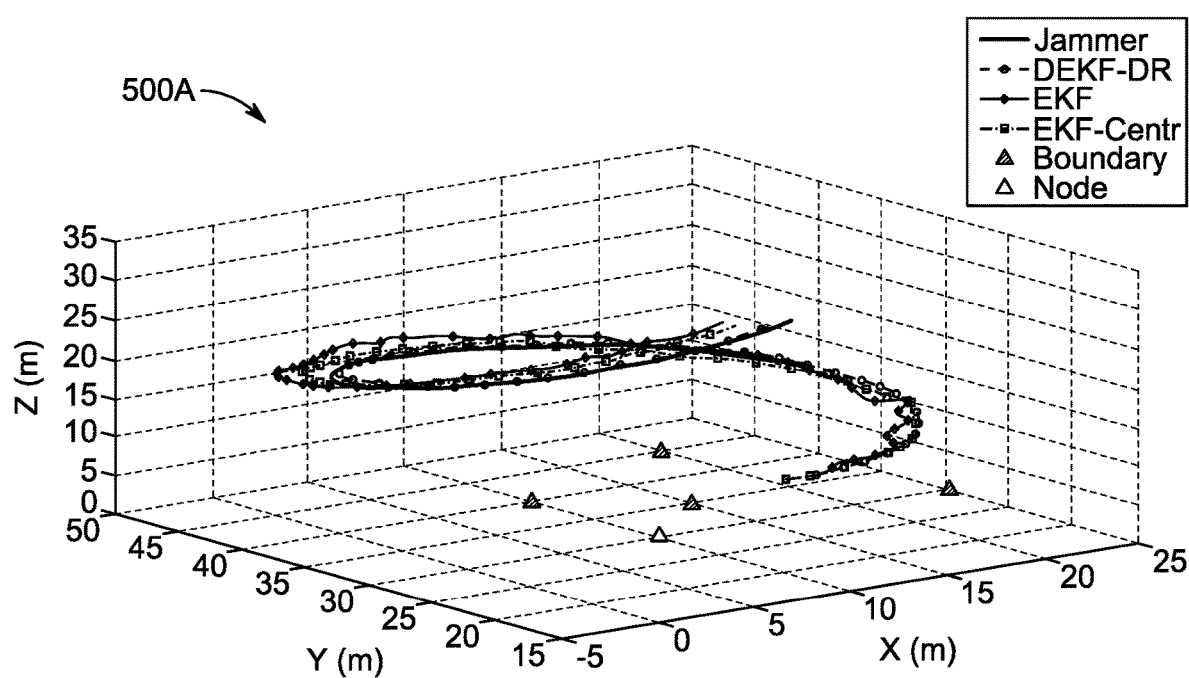
FIGS. 5A-5F are plots comparing simulations of multiple methods of estimating the path of an aerial vehicle, according to exemplary aspects of the present disclosure.
Figure 5B:
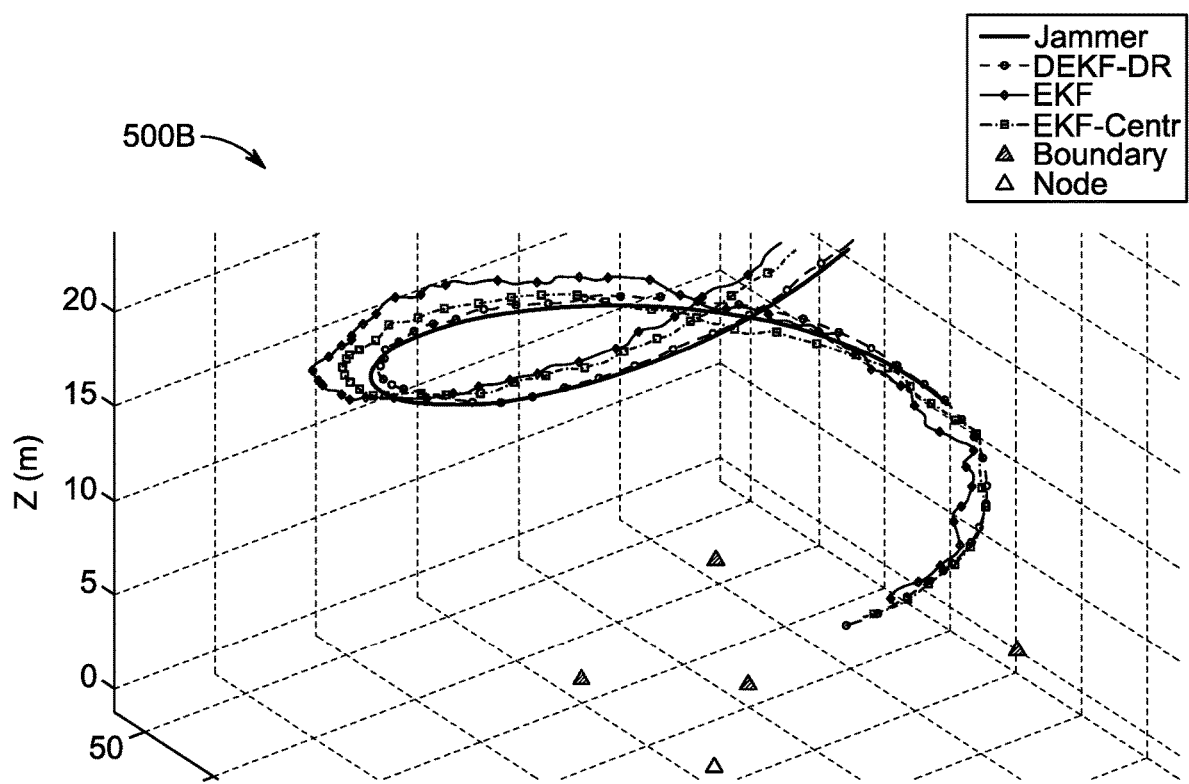
Figure 5C:
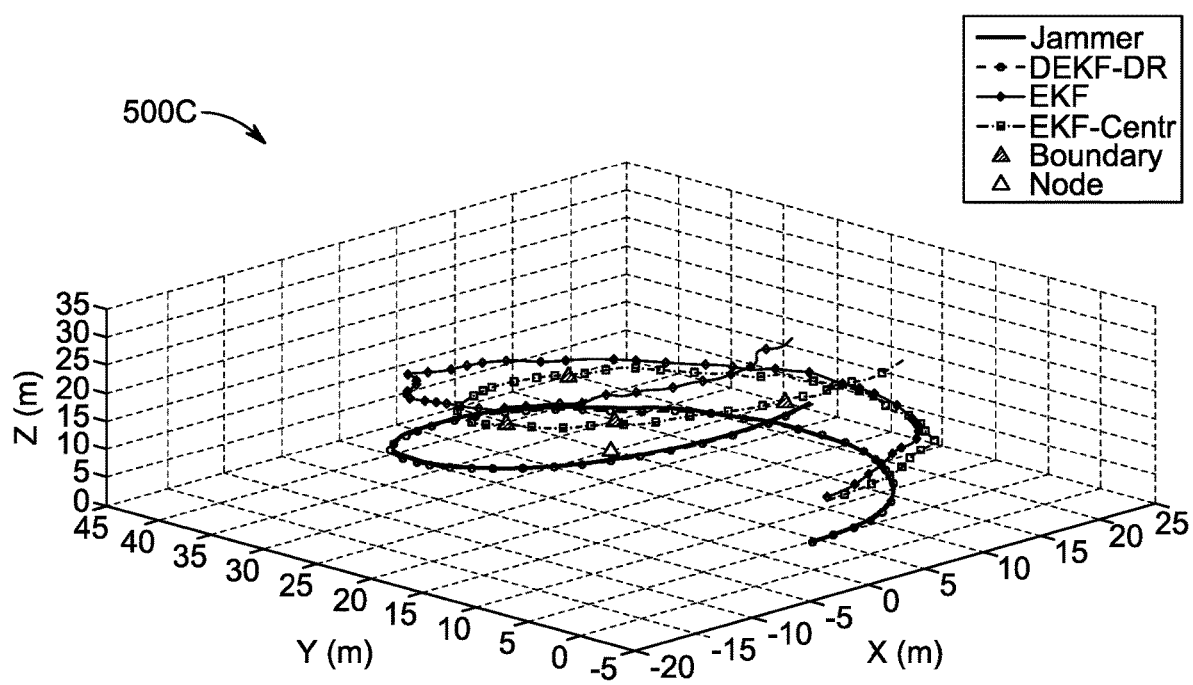
Figure 5D:
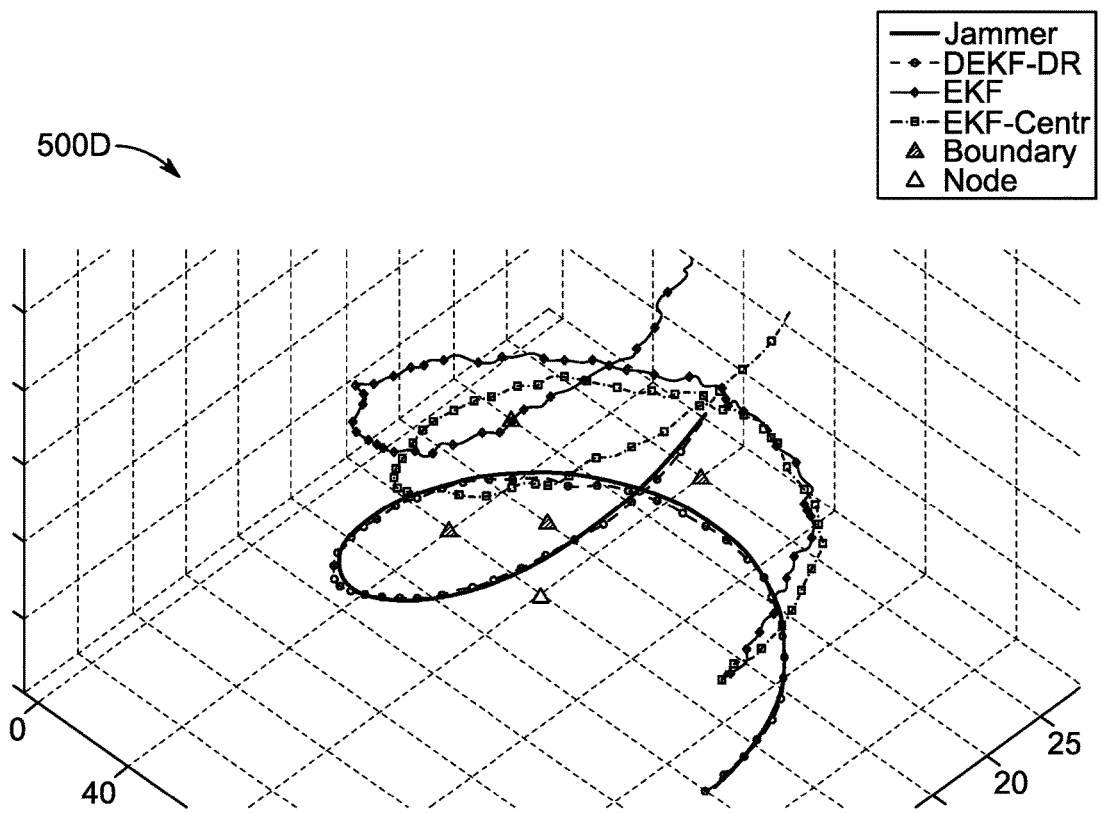
Figure 5E:
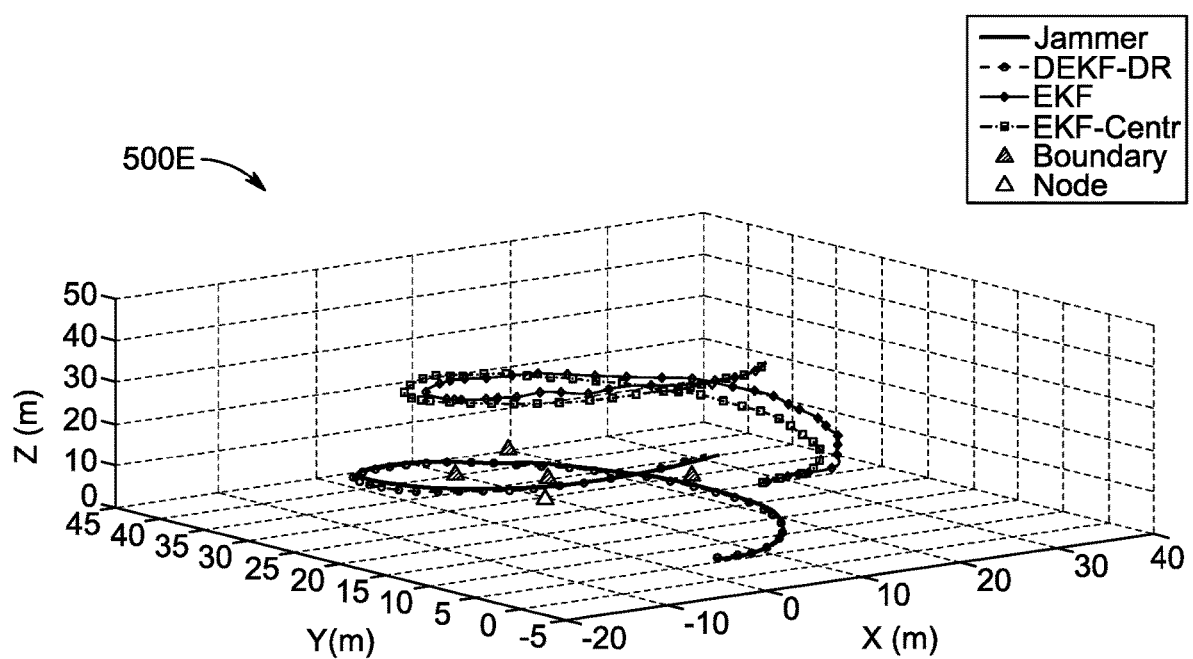
Figure 5F:
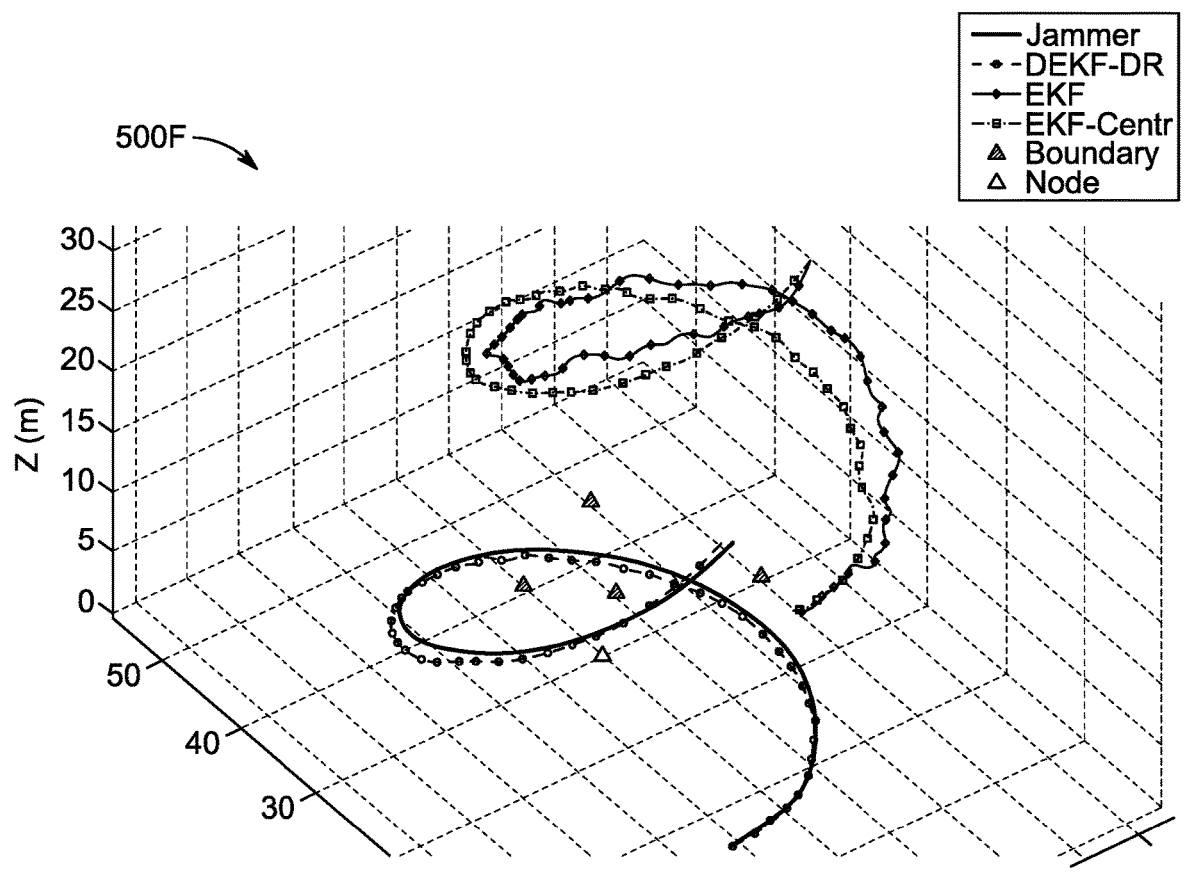

FIG. 4 is an exemplary flowchart of a method 400 for estimating a path of an aerial vehicle, according to exemplary aspects of the present disclosure. For instance, the aerial vehicle and the boundary node can be the same or substantially similar to aerial vehicle 110 and boundary node 120-1 as described above with respect to FIG. 1.

At a step 410, a distance function corresponding to the aerial vehicle and a boundary node is determined based on an initial coordinate location of the aerial vehicle and an initial coordinate location of the boundary node. For example, the aerial vehicle and the boundary node can be the same or substantially similar to aerial vehicle 110 and boundary node 120-1 as described above with respect to FIG. 1. The initial coordinate location of the aerial vehicle can be represented by ($x_J$, $y_J$, $z_J$), the initial coordinate location of the boundary node can be represented by ($x_B$, $y_B$, $z_B$), and the distance function can be represented by $d_{JB}$. The distance function $d_{JB}$ can then be determined as the square root of the sum of differences between constituent coordinates on each axis squared, i.e., the square root of $(x_B-x_J)^2+(y_B-y_J)^2(z_B-z_J)^2$.

At a step 415, a function of jamming power received at the boundary node from the aerial vehicle is determined based at least on the distance function and a transmission power of the boundary node. The function of jamming power represents a power associated with a jamming signal received from the aerial vehicle at the boundary node. The function of jamming power can be expressed as a sum of the transmission power of boundary node 120-1, an antenna constant of boundary node 120-1, and a Gaussian noise with zero mean minus the log function of the distance between jammer 110 and boundary node 120-1.

At a step 420, a trajectory of the aerial vehicle at a plurality of time periods is estimated by the boundary node based on an extended Kalman filter. The extended Kalman filter is determined based on the function of jamming power. In some embodiments, method 400 includes estimating the trajectory of the aerial vehicle at the plurality of time periods by the boundary node locally (such as boundary node 120-1 of FIG. 1), without collaborating with any other node in the network (e.g., any other boundary node, such as boundary node 120-2 or 120-3, or any unaffected node 130-1 through 130-3 of FIG. 1 as described above).

At a step 425, a power received at an unaffected node from the boundary node is determined. For example, the power can be received at an unaffected node 130-1 shown in FIG. 1, received from a boundary node 120-1, is determined.

At a step 430, a distance ratio coefficient is determined based at least on the power received at the unaffected node from the boundary node, the function of jamming power and a threshold value of a signal to noise ratio at an edge node (e.g., edge node 218). The edge node is located at a threshold distance from the initial coordinate location of the aerial vehicle. The threshold distance is a maximum distance that the jamming signal can potentially jam any node in the network. Stated within the context of FIG. 1, the threshold distance matches a jamming range 112 as calculated from the initial coordinate location of the aerial vehicle.

Method 400 continues at a step 435, when another distance function corresponding to the edge node and the boundary node is determined based at least on the distance function and the distance ratio coefficient.

At a step 440, another function of jamming power received at the edge node from the aerial vehicle is determined based at least on the function of jamming power and the distance ratio coefficient. The other function of jamming power represents another power associated with another jamming signal received from the aerial vehicle at the edge node. In other words, the method is an iterative process to continue tracking the path of an aerial vehicle such as jammer 110.

At a step 445, a function of power received at the boundary node from the edge node is determined based at least on the function of jamming power and the distance ratio coefficient. The other function of jamming power represents a power associated with a signal received from the edge node at the boundary node. For example, the other function of jamming power can be a power associated with a signal received from edge node 218 at boundary node 120-1.

At a step 450, the trajectory of the aerial vehicle at the plurality of time periods is estimated by the boundary node based on another extended Kalman filter. The other extended Kalman filter is determined based on the function of jamming power, the other function of jamming power received at the edge node from the aerial vehicle, and the function of power received at the boundary node from the edge node.

Performance Testing

A scenario in which the jammer 110 hovers in three-dimensional space (x, y, z) with constant acceleration equal to zero and variable velocity at each time step was considered in order to evaluate the performance of the proposed algorithm. For the sake of simulation, the boundary node 120-1 (alternatively referred to as the "tracker") was located at a specified position with a transmitting power of −35.5 dBm. The simulation further included a neighbor node (i.e., an unaffected node, such as unaffected node 130-1) near boundary node 120-1. The neighbor node was assumed to have the same transmitting power as that of boundary node 120-1. The jammer 110 started at a specified position at $t_0$ and with an assumed transmitting power equal to −20 dBm. The sensing range of boundary node 120-1 was simulated as 16 meters, while transmitting range of aerial vehicle 110 was around 90 m.

The disclosed DEKF-DR exhibited better localization performance in comparison with the DEKF and the EKF-Centr techniques during testing simulations. To measure the performance and the robustness of the algorithm disclosed in the instant application, various initial positions and trajectories were selected. The above-described DEKF-DR technique outperformed in all simulations and was able to estimate the jammer 110 more accurately. Both the DEKF and EKF-Centr methods estimated the path of the jammer's location with a greater degree of error when compared to the more accurate technique.

In additional simulations, the DEKF-DR algorithm again estimated the position of the aerial vehicle more accurately when compared to the EKF-Centr and the DEKF techniques. The maximum position error was less than 0.6 meters compared to 2.9 m and 2.4 m for the DEKF and the EKF-Centr methods, respectively. The accuracy of the DEKF-DR algorithm was an improvement across each axis of measurement as the overall average localization error was reduced. Given the results in the individual x, y and z axes, the simulation results verified the added overall and component-by-component (i.e., altitude and linear distances) accuracy of the DEKF-DR to detect the vehicle location in three-dimensional space.

Figure 6:
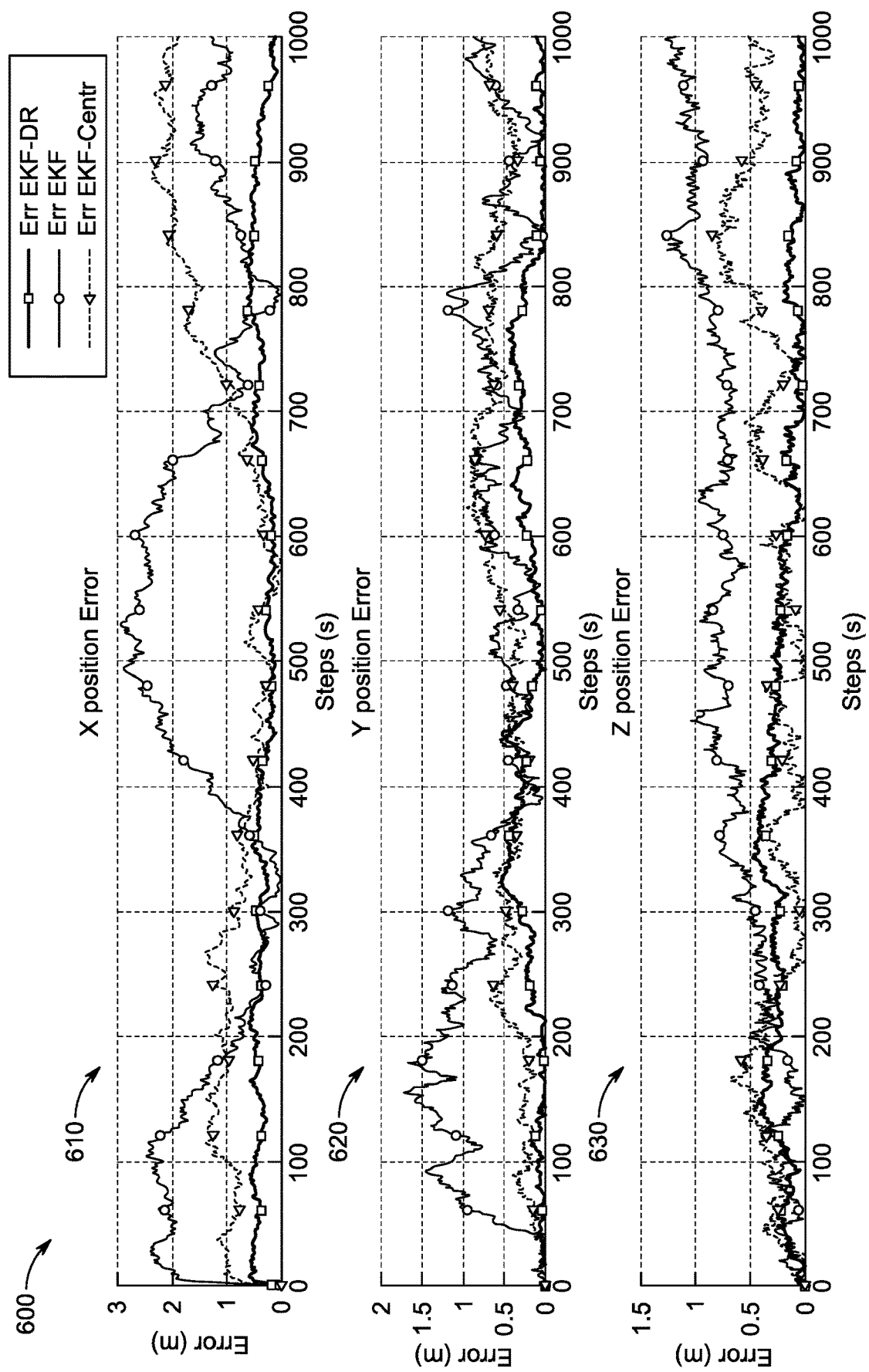
FIG. 6 is a graph of location errors of simulated estimates at each time step along x, y, and z axes, according to exemplary aspects of the present disclosure.

FIG. 6 is a graph of location errors of simulated estimates at each time step along x, y, and z axes, according to exemplary aspects of the present disclosure. Graph 610 depicts location error estimates at steps along the x axis, while graphs 620 and 630 show location error estimates along the y and z axes, respectively. In order to measure the performance of the proposed method, simulations were run 500 times and subsequently 1000 times.

As seen in each of graphs 610, 620 and 630, the disclosed algorithm of the instant application can estimate the jammer position more accurately when compared to the EKF-Centr and the DEKF methods. The maximum position error of the DEKF-DR method along the was less than 0.6 meters compared to 2.9 m and 2.4 m for the DEKF and the EKF-Centr techniques, respectively. The overall average error of the DEKF-DR in that testing was approximately 0.56 m. The DEKF-DR out-performed better along each component of the estimation, as the average localization error was about 0.3 m on the x-axis, 0.1 m on the y-axis, and 0.18 on the z-axis.

Figure 7A:
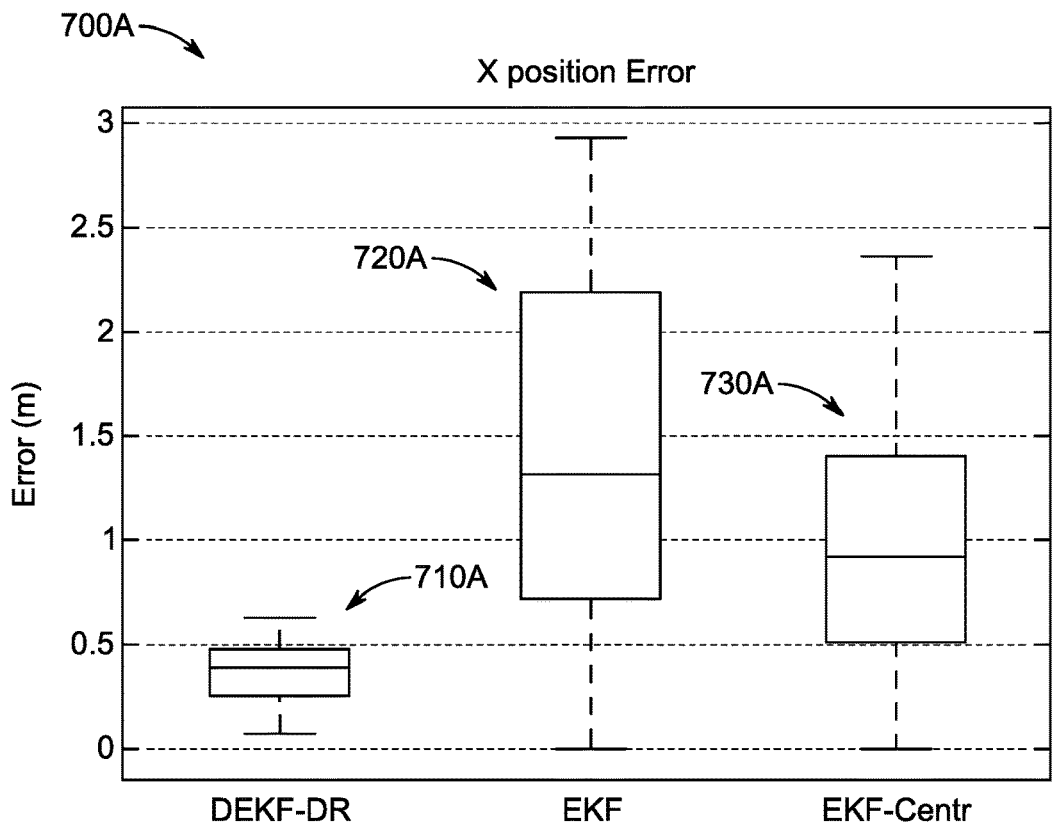
FIGS. 7A-7C are box plot comparisons of the simulation results depicted in FIG. 6, according to exemplary aspects of the present disclosure.
Figure 7B:
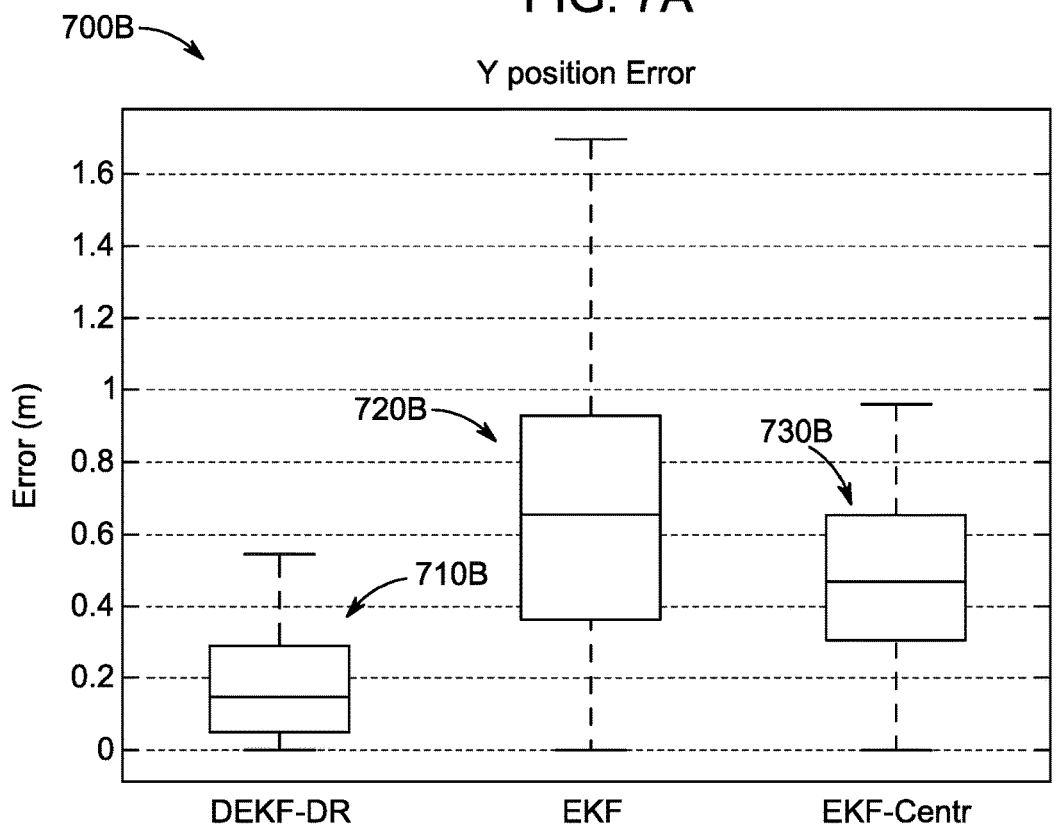
Figure 7C:
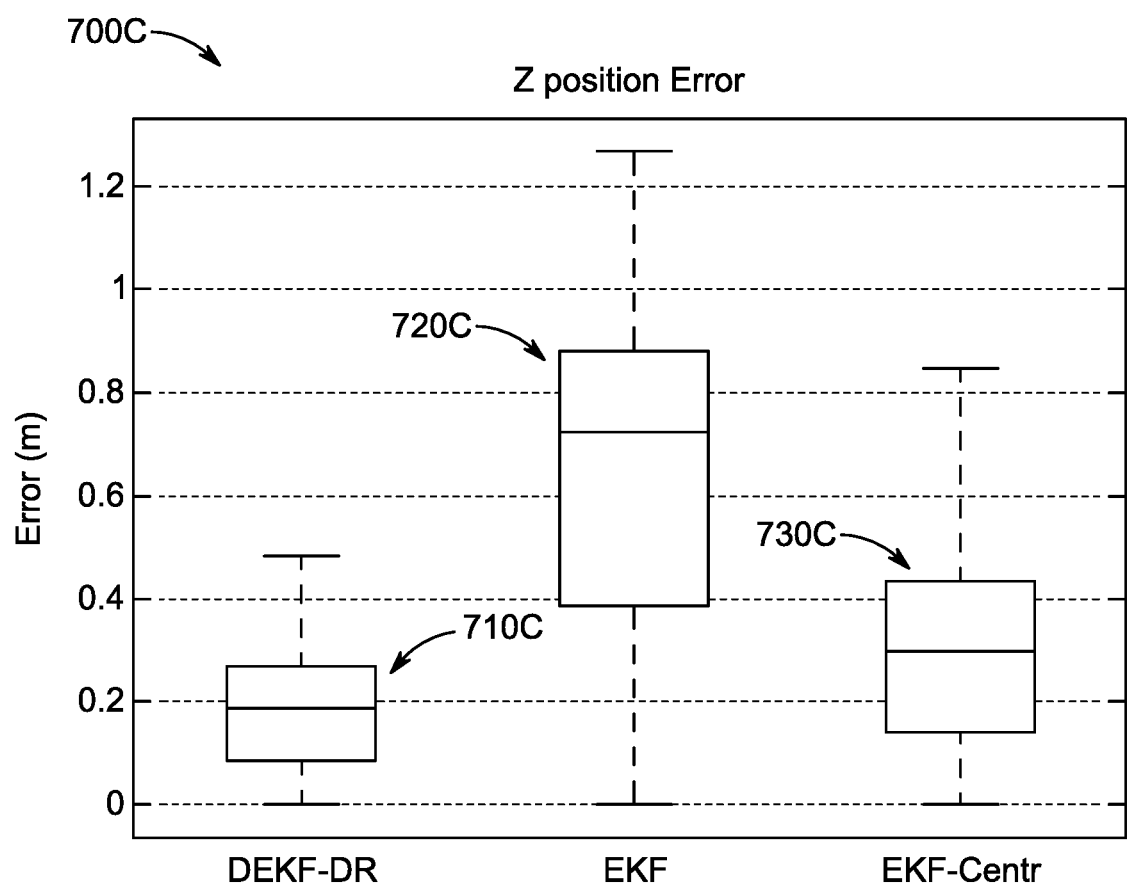

FIGS. 7A-7C are box plot comparisons of the simulation results depicted in FIG. 6, according to exemplary aspects of the present disclosure. In FIG. 7A, the median error for x position of the DEKF-DR shown by box plot 710A is less than 0.5 m compared to 1.3 m and 0.92 m for DEKF and EKF-Centr shown in box plots 720A and 730A, respectively. Box plot 710B showing the results of the DEKF-DR technique along the y axis is lower still, having a value below 0.2 m. Each of box plots 720B and 730B representing the EKF and EKF-Centr simulations shows errors more than two times that of DEKF-DR. Similarly, the median error for the z position, shown in FIG. 7C as box plot 710C, is less than 0.2 m for the DEKF-DR. This is again lower when compared to counterpart error estimates in 720C and 730C.

The results shown in FIGS. 7A-7C illustrate that the conventional EKF can exhibit a very low error, close to zero at times (as shown by the lower whiskers in box plots 720A, 720B and 720C). However, the conventional EKF technique also demonstrated an error value that is very high at times, giving an overall error tolerance that is highly fluctuating (i.e., in the corresponding upper whiskers in box plots 720A, 720B, and 720C). The values for EKF-Centr (found in box plots 730A, 730B, and 730C), were improved but still varying to a higher degree than the presently disclosed algorithm. On the other hand, the proposed DEKF-DR method consistently estimated position with a lower median localization error, across a tighter range of values and with reduced computational complexity than counterpart techniques.

The testing performed as mentioned above was completed using a universal software radio peripheral (USRP). As an example, one could perform rapid prototyping and performance simulations on many types of USRP devices, such as any found in the NI 294X series, available from National Instruments of Austin, Tex. Additional computing resources such as a laptop or a desktop computer, peripheral input and output devices, display devices, hard drives, ports, connections, adapters, and/or wiring will also be understood by one of skill in the relevant art to be part of testing equipment used to simulate the described estimation methods.

Figure 8:
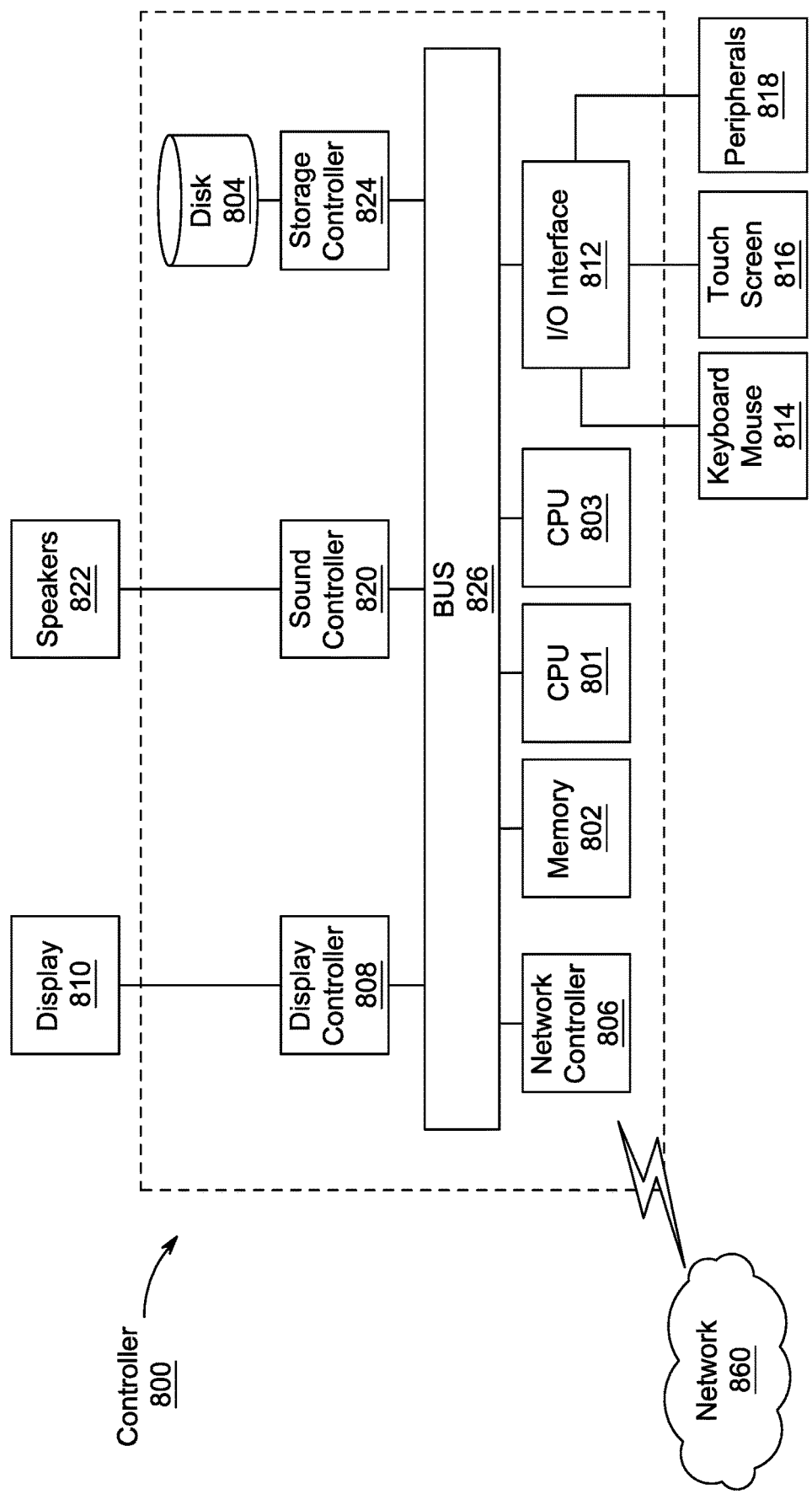
FIG. 8 is an illustration of a non-limiting example of details of computing hardware used in the computing system, according to exemplary aspects of the present disclosure.

Next, further details of the hardware description of the computing environment of the UAV path estimation apparatus according to exemplary embodiments is described with reference to FIG. 8. In FIG. 8, a controller 800 is described and is representative of a computer as described above with respect to performance testing. Controller 800 is a computing device which includes a CPU 801 that performs the processes described above/below. The process data and instructions may be stored in memory 802. These processes and instructions may also be stored on a storage medium disk 804 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 801, 803 and an operating system such as Microsoft Windows 7, Microsoft Windows 10, UNIX, Solaris, LINUX, Apple MAC-OS and other systems known to those skilled in the art.

The hardware elements in order to achieve the computing device may be realized by various circuitry elements, known to those skilled in the relevant art. For example, CPU 801 or CPU 803 may be a Xenon or Core processor from Intel of America or an Opteron processor from AMD of America, or may be other processor types that would be recognized by one of ordinary skill in the art. Alternatively, the CPU 801, 803 may be implemented on an FPGA, ASIC, PLD or using discrete logic circuits, as one of ordinary skill in the art would recognize. Further, CPU 801, 803 may be implemented as multiple processors cooperatively working in parallel to perform the instructions of the inventive processes described above.

The computing device in FIG. 8 also includes a network controller 806, such as an Intel Ethernet PRO network interface card from Intel Corporation of America, for interfacing with network 860. As can be appreciated, the network 860 can be a public network, such as the Internet, or a private network such as an LAN or WAN network, or any combination thereof and can also include PSTN or ISDN sub-networks. The network 860 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 808, such as a NVIDIA GeForce GTX or Quadro graphics adaptor from NVIDIA Corporation of America for interfacing with display 810, such as a Hewlett Packard HPL2445w LCD monitor. A general purpose I/O interface 812 interfaces with a keyboard and/or mouse 814 as well as a touch screen panel 816 on or separate from display 810. General purpose I/O interface also connects to a variety of peripherals 818 including printers and scanners, such as an OfficeJet or DeskJet from Hewlett Packard.

A sound controller 820 is also provided in the computing device such as Sound Blaster X-Fi Titanium from Creative, to interface with speakers/microphone 822 thereby providing sounds and/or music.

The general purpose storage controller 824 connects the storage medium disk 804 with communication bus 826, which may be an ISA, EISA, VESA, PCI, or similar, for interconnecting all of the components of the computing device. A description of the general features and functionality of the display 810, keyboard and/or mouse 814, as well as the display controller 808, storage controller 824, network controller 806, sound controller 820, and general purpose I/O interface 812 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 9.

Figure 9:
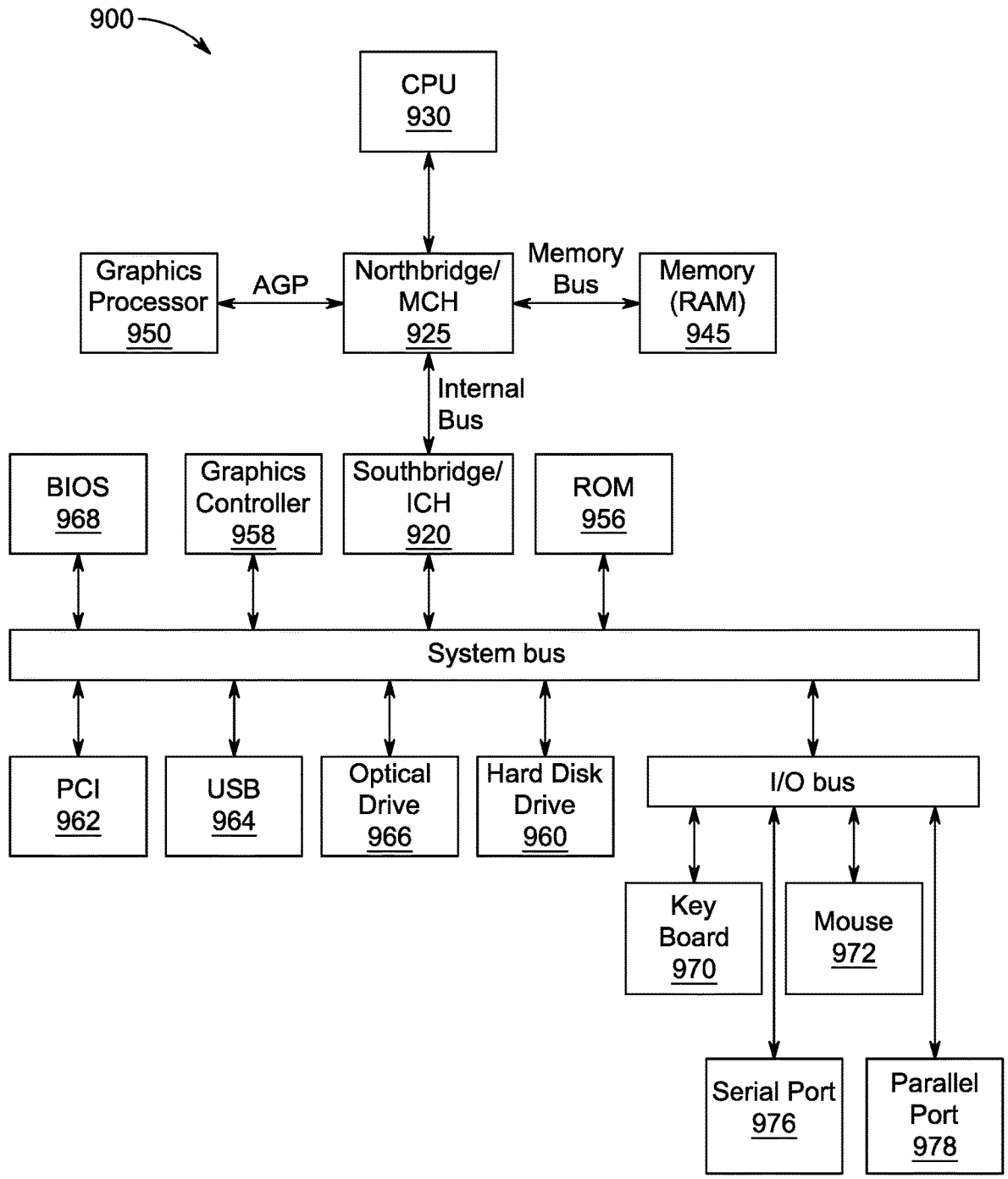
FIG. 9 is an exemplary schematic diagram of a data processing system used within the computing system, according to exemplary aspects of the present disclosure.

FIG. 9 shows a schematic diagram of a data processing system, according to certain embodiments, for performing the functions of the exemplary embodiments. The data processing system is an example of a computer in which code or instructions implementing the processes of the illustrative embodiments may be located.

In FIG. 9, data processing system 900 employs a hub architecture including a north bridge and memory controller hub (NB/MCH) 925 and a south bridge and input/output (I/O) controller hub (SB/ICH) 920. The central processing unit (CPU) 930 is connected to NB/MCH 925. The NB/MCH 925 also connects to the memory 945 via a memory bus, and connects to the graphics processor 950 via an accelerated graphics port (AGP). The NB/MCH 925 also connects to the SB/ICH 920 via an internal bus (e.g., a unified media interface or a direct media interface). The CPU Processing unit 930 may contain one or more processors and even may be implemented using one or more heterogeneous processor systems.

Figure 10:
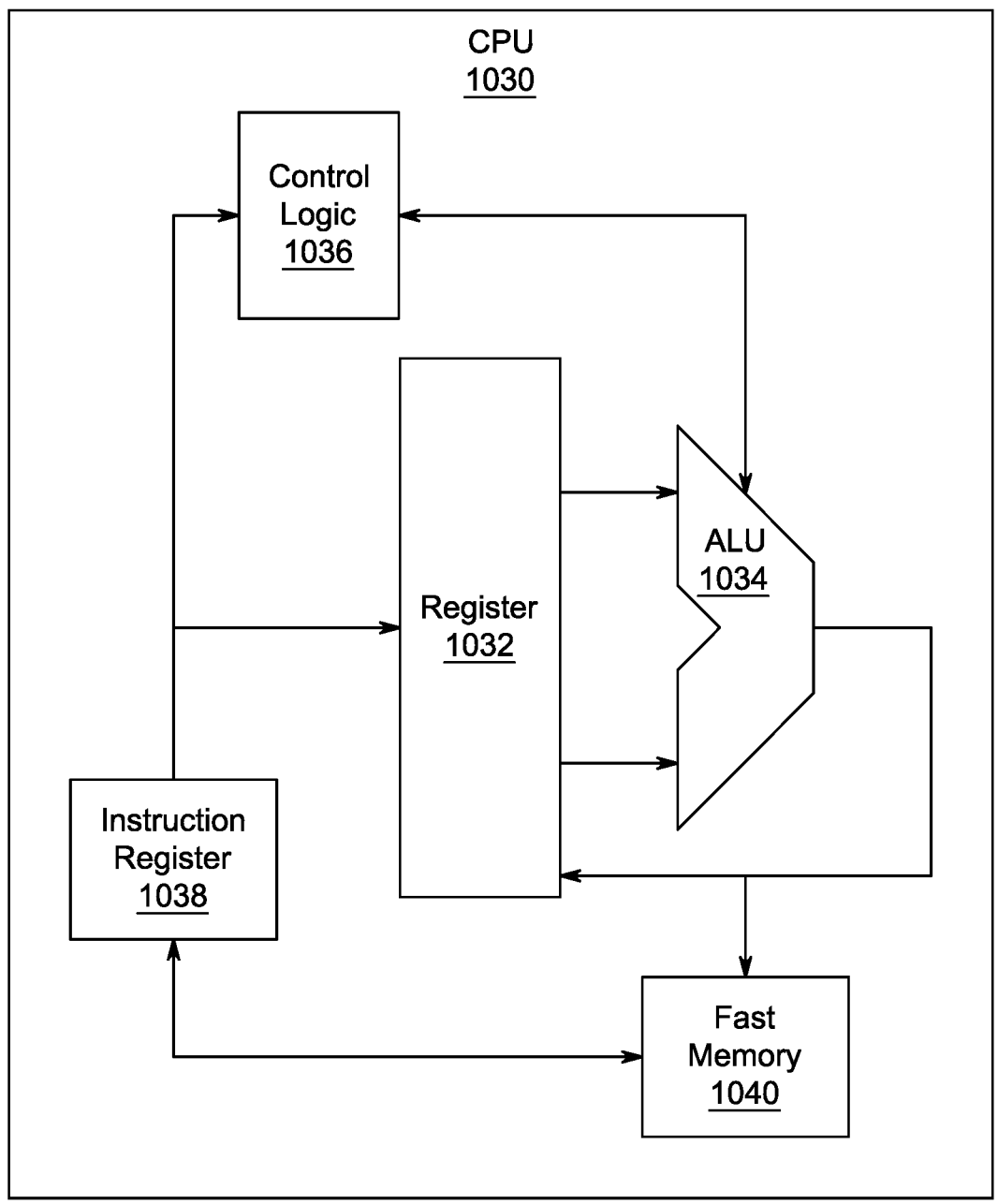
FIG. 10 is an exemplary schematic diagram of a processor used with the computing system, according to exemplary aspects of the present disclosure.

For example, FIG. 10 shows one implementation of CPU 930. In one implementation, the instruction register 1038 retrieves instructions from the fast memory 1040. At least part of these instructions are fetched from the instruction register 1038 by the control logic 1036 and interpreted according to the instruction set architecture of the CPU 930. Part of the instructions can also be directed to the register 1032. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1034 that loads values from the register 1032 and performs logical and mathematical operations on the loaded values according to the instructions. The results from these operations can be feedback into the register and/or stored in the fast memory 1040. According to certain implementations, the instruction set architecture of the CPU 930 can use a reduced instruction set architecture, a complex instruction set architecture, a vector processor architecture, a very large instruction word architecture. Furthermore, the CPU 930 can be based on the Von Neuman model or the Harvard model.

The CPU 930 can be a digital signal processor, an FPGA, an ASIC, a PLA, a PLD, or a CPLD. Further, the CPU 930 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 9, the data processing system 900 can include that the SB/ICH 920 is coupled through a system bus to an I/O Bus, a read only memory (ROM) 956, universal serial bus (USB) port 964, a flash binary input/output system (BIOS) 968, and a graphics controller 958. PCI/PCIe devices can also be coupled to SB/ICH 988 through a PCI bus 962.

The PCI devices may include, for example, Ethernet adapters, add-in cards, and PC cards for notebook computers. The Hard disk drive 960 and CD-ROM 966 can use, for example, an integrated drive electronics (IDE) or serial advanced technology attachment (SATA) interface. In one implementation the I/O bus can include a super I/O (SIO) device.

Further, the hard disk drive (HDD) 960 and optical drive 966 can also be coupled to the SB/ICH 920 through a system bus. In one implementation, a keyboard 970, a mouse 972, a parallel port 978, and a serial port 976 can be connected to the system bus through the I/O bus. Other peripherals and devices that can be connected to the SB/ICH 920 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 11:
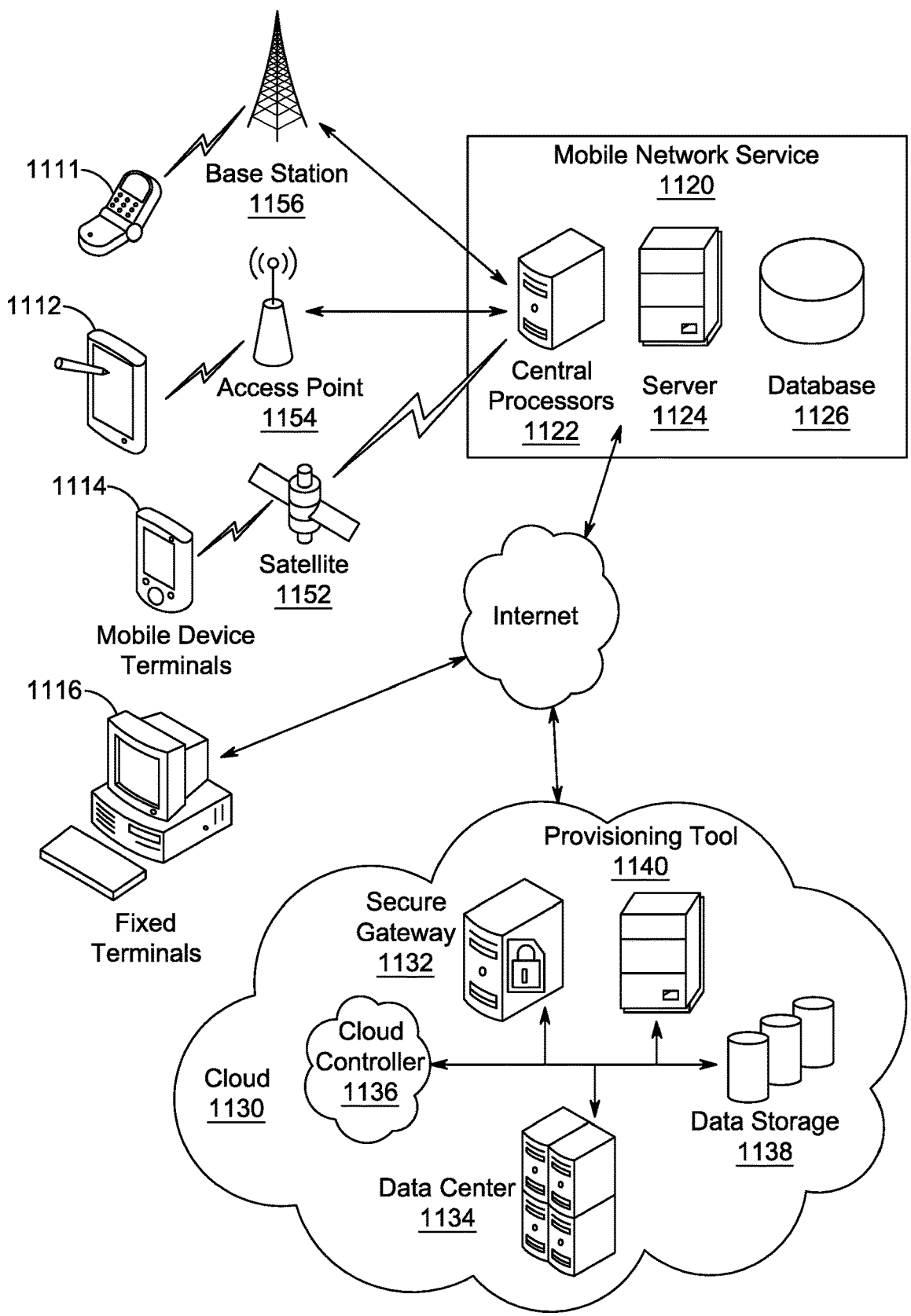
FIG. 11 is an illustration of a non-limiting example of distributed components which may share processing with the controller, according to exemplary aspects of the present disclosure.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 11, in addition to various human interface and communication devices (e.g., cell phones 1111, personal digital assistants (PDAs) 1112, smart phones or mobile device terminals 1114, display monitors or fixed terminals 1116, tablets not shown or numbered). The network may be a private network, such as a LAN or WAN, or may be a public network, such as the Internet. Access may be through a satellite 1152, an access point 1154, or base station 1156, to a mobile network service 1120. The mobile network service 1120 can include central processor(s) 1122, server(s) 1124, or database(s) 1126. Input to the system may be received via direct user input and received remotely either in real-time or as a batch process. Back-end processing may be enabled by cloud services 1130, with the aid of one or more of secure gateway 1132, data center 1134, cloud controller 1136, data storage 1138, and/or provisioning tool 1140. Additionally, some implementations may be performed on modules or hardware not identical to those described. Accordingly, other implementations are within the scope that may be claimed.

Algorithms used to track and localize a jammer UAV that hovers around a target area to block the communication channel between two transceivers are primarily divided into two categories: range-free and range-based schemes. For the first category, i.e. the range-free scheme, the accuracy of any range-free scheme is primarily based on node locations coupled with change in network topology. Examples of range-free technique include the Centroid Localization (CL) algorithm and the Weighted Centroid (WCL) algorithm. Each of the range-free schemes is sensitive to node locations and the number of nodes deployed. Further, detection of location is increasingly accurate as the number of nodes affected by the jammer UAV increases. On the other hand, the range-free scheme is less accurate when the affected nodes are located closer to each other or when the number of affected nodes is relatively limited.

To detect and predict a location of the jammer UAV, range-based schemes estimate a parameter called the jammer received signal strength (JRSS). These range-based schemes estimate the JRSS for an original signal of the jammer UAV, which results in more reliable estimations when compared to range-free scheme counterparts. One algorithm that has been proposed in this class of detection techniques is Centralized Extended Kalman Filtering ("EKF-Centr"), where the computation is based on a power of the jammer UAV power that is received from the boundary nodes at each time step. When using this method of jamming localization, increasing the number of boundary nodes increases the tracking efficiency. Other methods for detecting the location of the jammer UAV location have been realized by using the packet delivery ratio (PDR) rate at each node.

An adaptive received signal strength indicator (RSSI) filtering technique can be employed to improve a measured RSSI signal. This technique is beneficial in instances where multipath effects cause the measured RSSI signal to degrade. The aim of using this filtering technique is two-fold, to both enhance the localization accuracy as well as to reduce the computational complexity of the tracking system. RSSI-based techniques that are based on Kalman filtering to estimate the target position for a mobile target, leverage the situation where both the signal-to-noise ratio (SNR) and PDR decrease as the amount of noise increases during jamming attacks. Thus, any node that has a lower PDR than expected is considered to be a near-jammer node and the gradient descent technique is employed in order to track the jamming source.

A wide-band jammer localization method has also been developed using a combination of existing Difference of Arrivals (DOA), Time Difference of Arrivals (TDOA), and EKF techniques. More particularly, a DOA method provides the EKF with an accurate initial position, while TDOA calculations help the EKF for fast converge processing. As with certain of the previously mentioned approaches, this method is affected by the number nodes used for localization and tracking processes.

Each of the above-mentioned solutions has one or more significant drawbacks. For example, some approaches suffer from higher resource complexity due to heavy computational requirements for DOA/TDOA estimation or are sensitive to node locations and the number of nodes deployed. One or more of the known methods may also rely on centralized processing, exhibit a dependency on a large number of boundary nodes, or are otherwise highly sensitive to noise power (or SNR).

The technology described with respect to FIGS. 1-8, provide the advantages of improved average accuracy of localization estimates, as well as improved accuracy along each component axis of measurement. The disclosed algorithms and systems reduce the range within which the error may fall, giving a higher degree of confidence that a potentially harmful UAV is actually very close to where that UAV is estimated to be. In addition to these output-based enhancements, the described techniques and configurations are less complex to implement, thereby further reducing the computational overhead required to arrive at an improved estimate of UAV location.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method for estimating a path of an aerial vehicle engaged in attacking network devices over a wideband channel in a wireless communication network, the method comprising:
receiving a plurality of jamming signals from the aerial vehicle at a plurality of base stations, wherein each base station has at least one of a transceiver and an antenna;
determining, with circuitry of a processor, a first distance function corresponding to the aerial vehicle and a boundary node based on an initial coordinate location of the aerial vehicle and an initial coordinate location of the boundary node;
determining, with circuitry of the processor, a function of jamming power received at the boundary node from the aerial vehicle based at least on the first distance function and a transmission power of the boundary node, wherein the function of jamming power represents a power associated with a jamming signal received from the aerial vehicle at the boundary node; and
estimating, with circuitry of the processor, a trajectory of the aerial vehicle at a plurality of time periods by the boundary node based on an extended Kalman filter, wherein the extended Kalman filter is determined based on the function of jamming power.

2. The method of claim 1, wherein the estimating of the trajectory of the aerial vehicle at the plurality of time periods is performed by the boundary node locally, without collaborating with any other node in the network.

3. The method of claim 1, wherein the initial coordinate location of the aerial vehicle is represented by $(x_B, y_B, z_B)$ and the initial coordinate location of the boundary node is represented by $(x_J, y_J, z_J)$ and the first distance function is represented by $d_{JB}$, and $d_{JB}=\sqrt{(x_B-x_J)^2+(y_B-y_J')^2+(z_B-z_J')^2}$.

4. The method of claim 3, wherein the function of jamming power is represented by $P_{JB}$, and $P_{JB}=P_t+k-10n\log_{10}d_{JB}+X_o$, wherein $P_t$ represents the transmission power of the boundary node, k represents a constant depending on antenna characteristics of the boundary node, and $X_o$ represents a Gaussian noise with zero mean.

5. The method of claim 4, further comprising:
determining a power received at an unaffected node from the boundary node;
determining a distance ratio coefficient based at least on the power received at the unaffected node from the boundary node, the function of jamming power and a threshold value of a signal to noise ratio at an edge node, wherein the edge node is located at a threshold distance from the initial coordinate location of the aerial vehicle and the threshold distance is a maximum distance that the jamming signal can potentially jam any node in the network.

6. The method of claim 5, further comprising:
determining a second distance function corresponding to the edge node and the boundary node based at least on the second distance function and the distance ratio coefficient;
determining another function of jamming power received at the edge node from the aerial vehicle based at least on the function of jamming power and the distance ratio coefficient, wherein the another function of jamming power represents another power associated with another jamming signal received from the aerial vehicle at the edge node;
determining a function of power received at the boundary node from the edge node based at least on the function of jamming power and the distance ratio coefficient, wherein the another function of jamming power represents a power associated with a signal received from the edge node at the boundary node;
estimating the trajectory of the aerial vehicle at the plurality of time periods by the boundary node based on another extended Kalman filter, wherein the another extended Kalman filter is determined based on the function of jamming power, the another function of jamming power received at the edge node from the aerial vehicle, and the function of power received at the boundary node from the edge node.

7. The method of claim 6, wherein the distance ratio coefficient is represented by β, and $$\beta = 10^{\left(\frac{\gamma-P_{NB}+P_{JB}}{10n}\right)},$$

wherein $P_{NB}$ represents the power received at the unaffected node from the boundary node.

8. The method of claim 7, wherein the second distance function corresponding to the edge node and the boundary node is represented by $d_{EB}$, and $d_{EB}=d_{JB}(1-\beta)\sqrt{(x_B-x_J)^2+(y_B-y_J)^2+(z_B-z_J)^2}(1-\beta)$.

9. The method of claim 8, wherein the another function of jamming power received at the edge node from the aerial vehicle is represented by $P_{JE}$, and $P_{JE}=P_{JB}-10n\log_{10}(\beta)$.

10. The method of claim 9, wherein the function of power received at the boundary node from the edge node is represented by $P_{EB}$, and $P_{EB}=P_{JB}-10n\log_{10}(1-\beta)$.

11. A system for estimating a path of an aerial vehicle engaged in attacking network devices over a wideband channel in a wireless communication network, a plurality of base stations, wherein each base station has at least one of a transceiver and an antenna, and a processor with circuitry,
wherein the plurality of base stations is configured to receive a plurality of jamming signals from the aerial vehicle and;
wherein the circuitry is configured to:
determine a first distance function corresponding to the aerial vehicle and a boundary node based on an initial coordinate location of the aerial vehicle and an initial coordinate location of the boundary node;
determine a function of jamming power received at the boundary node from the aerial vehicle based at least on the first distance function and a transmission power of the boundary node, wherein the function of jamming power represents a power associated with a jamming signal received from the aerial vehicle at the boundary node; and estimate a trajectory of the aerial vehicle at a plurality of time periods by the boundary node based on an extended Kalman filter, wherein the extended Kalman filter is determined based on the function of jamming power.

12. The apparatus of claim 11, wherein the estimating of the trajectory of the aerial vehicle at the plurality of time periods is performed by the boundary node locally, without collaborating with any other node in the network.

13. The apparatus of claim 11, wherein the initial coordinate location of the aerial vehicle is represented by $(x_B, y_B, z_B)$ and the initial coordinate location of the boundary node is represented by $(x_J, y_J, z_J)$ and the first distance function is represented by $d_{JB}$, and $d_{JB} = \sqrt{(x_B-x_J)^2+(y_B-y_J)^2+(z_B-z_J)^2}$.

14. The apparatus of claim 13, wherein the function of jamming power is represented by $P_{JB}$, and $P_{JB}=P_t+k-10n\log_{10}d_{JB}+X_o$ wherein $P_t$ represents the transmission power of the boundary node, k represents a constant depending on antenna characteristics of the boundary node, and $X_o$ represents a Gaussian noise with zero mean.

15. The apparatus of claim 14, further configured to:
determining a power received at an unaffected node from the boundary node;
determining a distance ratio coefficient based at least on the power received at the unaffected node from the boundary node, the function of jamming power and a threshold value of a signal to noise ratio at an edge node, wherein the edge node is located at a threshold distance from the initial coordinate location of the aerial vehicle and the threshold distance is a maximum distance that the jamming signal can potentially jam any node in the network.

16. The apparatus of claim 15, further configured to:
determining a second distance function corresponding to the edge node and the boundary node based at least on the second distance function and the distance ratio coefficient;
determining another function of jamming power received at the edge node from the aerial vehicle based at least on the function of jamming power and the distance ratio coefficient, wherein the another function of jamming power represents another power associated with another jamming signal received from the aerial vehicle at the edge node;
determining a function of power received at the boundary node from the edge node based at least on the function of jamming power and the distance ratio coefficient, wherein the another function of jamming power represents a power associated with a signal received from the edge node at the boundary node;
estimating the trajectory of the aerial vehicle at the plurality of time periods by the boundary node based on another extended Kalman filter, wherein the another extended Kalman filter is determined based on the function of jamming power, the another function of jamming power received at the edge node from the aerial vehicle, and the function of power received at the boundary node from the edge node.

17. The apparatus of claim 16, wherein the distance ratio coefficient is represented by $\beta$, and $$\beta = 10^{\left(\frac{\gamma-P_{NB}+P_{JB}}{10n}\right)},$$

wherein $P_{NB}$ represents the power received at the unaffected node from the boundary node.

18. The apparatus of claim 17, wherein the second distance function corresponding to the edge node and the boundary node is represented by $d_{EB}$, and $d_{EB}=d_{JB}(1-\beta)\sqrt{(x_B-x_J)^2+(y_B-y_J)^2+(z_B-z_J)^2}(1-\beta)$.

19. The apparatus of claim 18, wherein the another function of jamming power received at the edge node from the aerial vehicle is represented by $P_{JE}$, and $P_{JE} P_{JB}-10n\log_{10}(\beta)$.

20. The apparatus of claim 19, wherein the function of power received at the boundary node from the edge node is represented by $P_{EB}$, and $P_{EB}=P_{JB}-10n\log_{10}(1-\beta)$.

* * * * *